(12) United States Patent
Islam et al.

(10) Patent No.: US 6,876,489 B2
(45) Date of Patent: Apr. 5, 2005

(54) ALL BAND AMPLIFIER

(75) Inventors: Mohammed N. Islam, Allen, TX (US);
Carl Dewilde, Richardson, TX (US);
Michael Freeman, Canton, MI (US)

(73) Assignee: Xtera Communications, Inc., Allen, TX (US)

( * ) Notice: Subject to any disclaimer, the term of this patent is extended or adjusted under 35 U.S.C. 154(b) by 0 days.

(21) Appl. No.: 10/414,890

(22) Filed: Apr. 15, 2003

(65) Prior Publication Data

US 2003/0189750 A1 Oct. 9, 2003

Related U.S. Application Data

(63) Continuation of application No. 09/768,367, filed on Jan. 22, 2001, now Pat. No. 6,574,037, which is a continuation-in-part of application No. 09/719,591, filed as application No. PCT/US99/13551 on Jun. 16, 1999.
(60) Provisional application No. 60/089,426, filed on Jun. 16, 1998.

(51) Int. Cl.[7] .................................................. H01S 3/00
(52) U.S. Cl. ....................................................... 359/334
(58) Field of Search ........................................ 359/334

(56) References Cited

U.S. PATENT DOCUMENTS

| | | | |
|---|---|---|---|
| 5,831,754 A | | 11/1998 | Nakano ....................... 359/161 |
| 6,081,366 A | * | 6/2000 | Kidorf et al. .......... 359/341.32 |
| 6,320,884 B1 | * | 11/2001 | Kerfoot et al. ................. 372/3 |

OTHER PUBLICATIONS

H. Masuda, "Ultra Wide–Band Raman Amplification with a Total Gain–Bandwidth of 132 nm of Two Gain–Bands Around 1.5 μm," ECOC '99, Nice, France, 2 pages, Sep. 1999.
E.M. Dianov, "Raman fiber amplifiers," Fiber Optics Research Center at the General Physics Institute of the Russian Academy of Sciences, Moscow, Russia, 5 pages, © 1999.
A.K. Srivastava, et al., "System Margin Enhancement with Raman Gain in Multi–Span WDM Transmission," Technical Digest, OFC '99, 3 pages, Friday Feb. 26, 1999.
PCT, Written Opinion, International Preliminary Examining Authority, 6 pages. International Application # PCT/US02/01806, Mar. 10, 2003.

* cited by examiner

*Primary Examiner*—Thomas H. Tarcza
*Assistant Examiner*—Deandra M. Hughes
(74) *Attorney, Agent, or Firm*—Baker Botts L.L.P.

(57) ABSTRACT

A Raman amplifier apparatus includes an optical transmission line with an input to receive an optical signal, an output that passes the optical signal, a first Raman gain fiber and a second Raman gain fiber. A first WDM is positioned between the second Raman gain fiber and the output. A first set of pump wavelengths is input to the first WDM. A second WDM is positioned between the first and second Raman gain fibers. A second set of pump wavelengths is input to the second WDM. At least a portion of the first set of pump wavelengths are different than the second set of pump wavelengths. The first and second set of pump wavelengths propagate in the same direction.

102 Claims, 9 Drawing Sheets

US 6,876,489 B2

ALL BAND AMPLIFIER

CROSS REFERENCE TO RELATED APPLICATIONS

This application is a continuation application of and claims priority from U.S. application Ser. No. 09/768,367, filed Jan. 22, 2001 now U.S. Pat. No. 6,574,037, which is a continuation-in-part of and claims the benefit of priority from U.S. application Ser. No. 09/719,591, filed Dec. 12, 2000. U.S. application Ser. No. 09/719,591 claims the benefit of PCT Application US99/13551, filed Jun. 16, 1999, which claims the benefit of 60/089,426, filed Jun. 16, 1998, which applications are fully incorporated herein by reference.

FIELD OF THE INVENTION

The present invention relates generally to optical amplifiers, and more particularly to optical amplifiers that cover multiple wavelength bands.

BACKGROUND

The demand for bandwidth continues to grow exponentially on fiber-optic superhighways due to applications such as data communications and the Internet. Consequently, there is much effort at exploiting the bandwidth of optical fibers by using higher speeds per channel—so-called time-division multiplexed systems—and multiple wavelengths of light—so-called wavelength-division multiplexing (WDM).

Most of the fiber-optic networks currently deployed use one of two kinds of fiber: standard single-mode fiber ("standard" fiber) or dispersion-shifted fiber (DSF). Standard fiber has a zero dispersion wavelength around 1310 nm, and the dispersion is primarily resulting from the inherent glass dispersion. Most of the terrestrial network in the US and most of the world is, in fact, based on standard fiber. In DSF, on the other hand, waveguide dispersion is used to shift the zero dispersion wavelength to longer wavelengths. A conventional DSF will have a zero dispersion wavelength at 1550 nm, coinciding with the minimum loss in a fused silica fiber. However, the zero dispersion wavelength can be shifted around by varying the amount of waveguide dispersion added. DSF is used exclusively in two countries, Japan and Italy, as well as in new long-haul links.

The limiting factors for a fiber-optic transmission line include loss, dispersion and gain equalization. Loss refers to the fact that the signal attenuates as it travels in a fiber due to intrinsic scattering, absorption and other extrinsic effects such as defects. Optical amplifiers, for example, can be used to compensate for the loss. Dispersion means that different frequencies of light travel at different speeds, and it comes from both the material properties and waveguiding effects. When using multi-wavelength systems and due to the non-uniformity of the gain with frequency, gain equalization is required to even out the gain over the different wavelength channels.

The typical solution to overcoming these limitations is to place periodically in a transmission system elements to compensate for each of these problems. For example, FIG. 1 shows that a dispersion compensator 40 can be used to cancel the dispersion, an optical amplifier 50 can be used to balance the loss, and a gain equalization element 60 can be used to flatten the gain. Examples of dispersion compensators include chirped fiber gratings and dispersion compensating fiber (DCF). Examples of optical amplifiers include erbium-doped fiber amplifiers (EDFAs), Raman amplifiers, and non-linear fiber amplifiers (NLFAs). U.S. Pat. No. 5,778,014 discloses Sagnac Raman amplifiers and cascade lasers.

Finally, examples of gain equalizers include Mach-Zehnder interferometers and long period gratings. Rather than building a system out of these individual components, it may be easier and more cost effective to combine two or more of the functions in FIG. 1 into a single component as shown in U.S. Pat. No. 5,887,093.

Another problem that arises in WDM systems is interaction or cross-talk between channels through nonlinearities in the fiber. In particular, four-wave mixing (4WM) causes exchange of energy between different wavelength channels, but 4WM only phase matches near the zero dispersion wavelength. Consequently, if a fiber link is made from conventional DSF, it is difficult to operate a WDM system from around 1540–1560 nm. This turns out to be quite unfortunate because typical EDFA's have gain from 1535–1565 nm, and the more uniform gain band is near 1540–1560 nm. A second fiber nonlinearity that can be troublesome is modulation instability (MI), which is 4WM where the fiber's nonlinear index-of-refraction helps to phase match. However, MI only phase matches when the dispersion is positive or in the so-called soliton regime. Therefore, MI can be avoided by operating at wavelengths shorter than the zero dispersion wavelength.

As the bandwidth utilization over individual fibers increases, the number of bands used for transmission increases. For WDM systems using a number of bands, additional complexities arise due to interaction between and amplification in multi-band scenarios. In particular, particular system designs are needed for Raman amplification in multi-band transmission systems. First, a new nonlinearity penalty arises from the gain tilt from the Raman effect between channels. This arises because long wavelength channels tend to rob energy from the short wavelength channels. Therefore, a means of minimizing the gain tilt on existing channels with the addition of new WDM channels is required.

To minimize both the effects of 4WM and Raman gain tilt, another technical strategy is to use distributed Raman amplification. In a WDM system with multi-bands, a complexity arises from interaction between the different pumps along the transmission line.

There is a need for broadband amplifiers that span more than 40 nm of bandwidth. There is a further need for broadband amplifiers that amplify wavelengths in the low loss window of optical fibers. There is yet a further need for broadband amplifiers that reduce the cost per wavelength. There is a need for broadband amplifiers without band splitters and combiners and guard bands between the bands.

SUMMARY OF THE INVENTION

Accordingly, an object of the present invention is to provide broadband amplifiers that span more than 40 nm of bandwidth.

Another object of the present invention is to provide broadband amplifiers that amplify wavelengths in the low loss window of optical fibers.

Yet another object of the present invention is to provide a Raman amplifier apparatus with first and second Raman gain fibers.

A further object of the present invention is to provide a Raman amplifier apparatus with first and second Raman gain fibers, with optical signals traveling in a first direction and first and second pump wavelengths traveling in a reverse direction relative to the first direction.

Another object of the present invention is to provide a Raman amplifier apparatus with first and second Raman gain fibers, where a majority of longer signal wavelengths are amplified before shorter signal wavelengths.

These and other objects of the present invention are achieved in a Raman amplifier apparatus with an optical transmission line including an input to receive an optical signal, an output that passes the optical signal, a first Raman gain fiber and a second Raman gain fiber. A first WDM is positioned between the second Raman gain fiber and the output. A first set of pump wavelengths is input to the first WDM. A second WDM is positioned between the first and second Raman gain fibers. A second set of pump wavelengths is input to the second WDM. At least a portion of the first set of pump wavelengths are different than the second set of pump wavelengths. The first and second set of pump wavelengths propagate in the same direction.

In another embodiment of the present invention, an optical amplifier includes an optical fiber with an signal input port, an optical signal output port, at least a first Raman fiber amplifier and a second Raman fiber amplifier. The optical fiber is configured to be coupled to at least one optical signal source that produces an optical signal. A first WDM is positioned between the second Raman gain fiber and the output port. The first WDM is configured to be coupled to a first pump source that produces a first set of pump wavelengths. A second WDM is positioned between the first and second Raman gain fibers. The second WDM is configured to be coupled to a second pump source that produces a second set of pump wavelengths. At least a portion of the first set of pump wavelengths are different than the second set of pump wavelengths. The optical signal travels in a first direction and the first and second pump wavelengths travel in a reverse direction relative to the first direction.

In another embodiment of the present invention, an amplifier apparatus includes an optical transmission line with an input to receive an optical signal, an output that passes the optical signal, a first gain fiber and a second gain fiber. A first WDM is positioned between the second gain fiber and the output. A first set of pump wavelengths is input to the first WDM. A second WDM is positioned between the first and second gain fibers. A second set of pump wavelengths is input to the second WDM. At least a portion of the first set of pump wavelengths are different than the second set of pump wavelengths. The first and second set of pump wavelengths propagate in the same direction.

In another embodiment of the present invention, a method of amplification provides a Raman amplifier apparatus that includes an optical transmission line with an input to receive an optical signal, an output that passes the optical signal, a first Raman gain fiber and a second Raman gain fiber. A signal with multiple wavelengths is introduced into the input. The signal is amplified in the Raman amplifier apparatus. A majority of longer wavelengths of the signal are amplified before the shorter wavelengths are amplified.

In another embodiment of the present invention, a method of amplification provides an amplifier apparatus with first and second pump sources coupled to first and second ports of an optical transmission line, an output that passes the optical signal, a first gain fiber and a second gain fiber. Signals are introduced to an input of the optical transmission line. The first and second gain fibers are pumped with a first set of pump wavelengths from the first pump source and a second set of pump wavelengths from the second pump source. At least a portion of the first set of pump wavelengths is different than the second set of pump wavelengths. At least an 80 nm bandwidth of signal is amplified.

DETAILED DESCRIPTION

Figure 1:
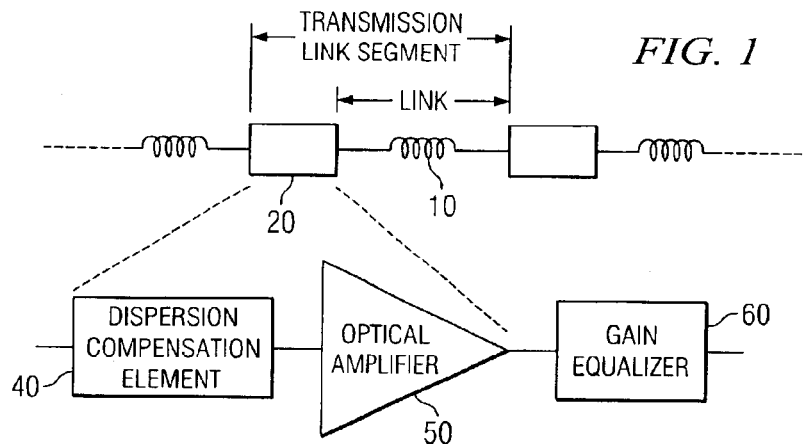
FIG. 1 is a schematic diagram which depicts an exemplary transmission system, where periodically within the link elements are inserted components that provide dispersion compensation, optical amplification and gain equalization.

An embodiment of the present invention combines the functions of optical amplification and dispersion compensation advantageously to simplify the implementation of dispersion managed systems. Some embodiments of the present invention include a Dispersion-Managing Raman Amplifier (DMRA) using Raman amplification in a fiber that dispersion compensates for the surrounding transmission link.

More specifically, in some embodiments the DMRA of the present invention comprises an input port for inputting an optical signal having a wavelength $\lambda$, a distributed gain medium for receiving the optical signal and amplifying and spectrally broadening the same therein through Raman scattering, a pump source operated at wavelength $\lambda_p$ for generating a pumping light to pump the distributed gain medium, and an output port for outputting the amplified and spectrally broadened optical signal. The dispersion and length of the distributed gain medium can be selected to be of the same magnitude of dispersion-length product as the transmission link but of the opposite sign of dispersion. The fiber can be made single spatial mode for the pump and signal wavelengths by making the cut-off wavelength of the gain fiber shorter than $\lambda_p$. Also, the amplifier can be pumped so the net gain exceeds the sum of losses in the transmission link and the dispersion compensating fiber.

A first embodiment of the DMRA uses open-loop amplification with an optical fiber gain medium. A pump source is used, where the fiber is either bi-directionally pumped or pumped in two segments. The two gain segments can be coupled through an isolator. Alternatively, the two gain segments can be connected through a gain equalization element and/or an optical add/drop multiplexer.

A second embodiment of the DMRA uses a Sagnac Raman cavity that is pumped and uses the dispersion compensating fiber within the loop. Feedback in the Sagnac Raman cavity reduces the required pump power, and the broadband cavity design supports much of the generated bandwidth. The Sagnac Raman design can automatically achieve bi-directional pumping.

A third embodiment of the DMRA amplifier uses a circulator loop cavity with chirped Bragg gratings, where the fiber is pumped in two parts to retain a strictly counter-propagating pumping scheme. The gain fiber length and dispersion in various embodiments can depend on whether the transmission link uses standard or DS fiber.

Various embodiments also relate to a dispersion and nonlinearity managed system where the transmission links comprises DSF. To achieve a multiple-wavelength WDM system, operation can be chosen to be in the "violet" band between 1430–1530 nm, avoiding the wavelength region surrounding the zero dispersion wavelength. A DMRA can be used where the gain fiber also does dispersion compensation. The local dispersion might not be small at any point within the fiber link, although average dispersion over the entire link can be adjusted to be approximately zero. Thus, the 4WM penalty can be removed since 4WM may not phase match. Also, since operation can be in the normal dispersion regime of the transmission fiber, MI also may not phase match.

Various embodiments also relate to minimizing the gain tilt across existing bands by symmetric addition (number wise) of channels at longer and shorter wavelengths to the existing bands. By adding wavelengths in the long-wavelength L-band symmetrically with the short-wavelength S-band, the energy change in the conventional C-band can be minimized. The C-band and L-band can be amplified with erbium-doped fiber amplifiers. The S-band can use discrete or distributed Raman amplifiers. In some embodiments, the gain in the S-band should exceed the gain in the C-band, and the C-band may require more gain than the L-band.

In addition, various embodiments relate to using distributed Raman amplification in multi-band systems to reduce the nonlinear fiber propagation effects. In broadband distributed Raman amplification, the nonlinear interaction between pumps for different bands can be minimized by spatially dispersing alternate band pumps and/or by cross-polarizing alternate pump bands. The orthogonalizing of adjacent band pumps can be done in purely distributed systems or hybrid discrete/distributed systems.

Stimulated Raman scattering effect, MI and 4WM can be the result of third-order nonlinearities that occur when a dielectric material such as an optical fiber is exposed to intense light. The third-order nonlinear effect can be proportional to the instantaneous light intensity.

Figure 2:
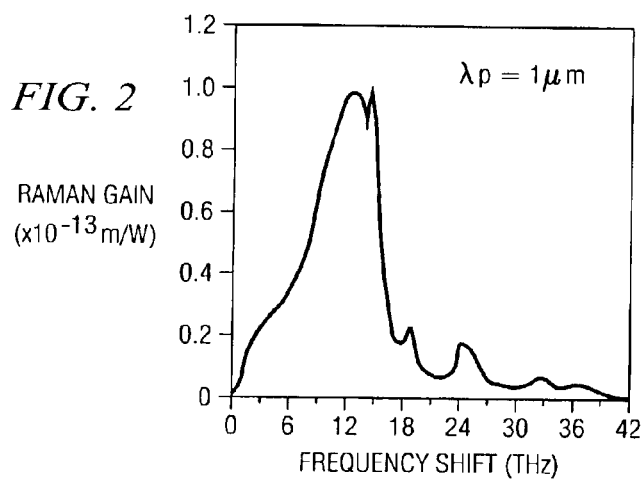
FIG. 2 is a graph showing the measured Raman gain spectrum for fused silica at a pump wavelength of 1000 nm.

Stimulated Raman scattering is an important nonlinear process that can turn optical fibers into amplifiers and tunable lasers. Raman gain results from the interaction of intense light with optical phonons in silica fibers, and the Raman effect leads to a transfer of energy from one optical beam, the pump, to another optical beam, the signal. The signal can be downshifted in frequency (or upshifted in wavelength) by an amount determined by vibrational modes of silica fibers. The Raman gain coefficient $g_r$ for silica fibers is shown in FIG. 2. Notably, the Raman gain $g_r$ extends over a large frequency range (up to 40 THz) with a broad peak centered at 13.2 THz (corresponding to a wavelength of 440 $cm^{-1}$). This behavior over the large frequency range can be from the amorphous nature of the silica glass and enables the Raman effect to be used in broadband amplifiers. The Raman gain also depends on the composition of the fiber core and can vary with different dopant concentrations.

Raman amplification has some attractive features. First, Raman gain is a good candidate for upgrading existing fiber optic links because it is based on the interaction of pump light with optical phonons in the existing fibers. Second, loss might not be excessive in the absence of pump power, other than the loss of the fiber inserted—an important consideration for system reliability.

Raman cascading is the mechanism by which optical energy at the pump wavelength is transferred, through a series of nonlinear polarizations, to an optical signal at a longer wavelength. Each nonlinear polarization of the dielectric produces a molecular vibrational state corresponding to a wavelength that is offset from the wavelength of the light that produced the stimulation. The nonlinear polarization effect is distributed throughout the dielectric, resulting in a cascading series of wavelength shifts as energy at one wavelength excites a vibrational mode that produces light at a longer wavelength. This process can cascade through numerous orders. Because the Raman gain profile has a peak centered at 13.2 THz in silica fibers, one Raman order can be arranged to be separated from the previous order by 13.2 THz.

Cascading makes stimulated Raman scattering amplifiers very desirable. Raman amplification itself can be used to amplify multiple wavelengths (as in wavelength division multiplexing) or short optical pulses because the gain spectrum is very broad (a bandwidth of greater than 5 THz around the peak at 13.2 THz). Cascading enables Raman amplification over a wide range of different wavelengths. By varying the pump wavelength or by using cascaded orders of Raman gain, the gain can be provided over the entire telecommunications window between 1300 nm and 1600 nm.

Modulational Instability (MI) and Four-Wave Mixing (4WM) involve two pump (P) photons that create Stokes (S) and anti-Stokes (A) photons. Both MI/4WM and Raman amplification arise from the third order susceptibility $\Pi^{(3)}$ in optical fibers. The real part of $\Pi^{(3)}$, the so-called nonlinear index of refraction $n_2$, is responsible for MI/4WM, while the imaginary part of $\Pi^{(3)}$ associated with molecular vibrations corresponds to the Raman gain effect. In some silica fibers, about $4/5$ths of $n_2$ is an electronic, instantaneous nonlinearity caused by ultraviolet resonances, while about $1/5$th of $n_2$ arises from Raman-active vibrations, e.g., optical phonons. The imaginary part of this latter contribution corresponds to the Raman gain spectrum of FIG. 2.

Just as in Raman amplification, MI/4WM gain can be present in every fiber. MI and 4WM can depend on phase-matching. 4WM can be unimportant in long fibers due to the requirement for phase-matching, unless operation is near the zero dispersion wavelength. However, MI can act as self-phase-matched because the nonlinear index of refraction can be used to phase match the pump and sidebands. This is particularly true when operating near the zero dispersion wavelength in fibers. In 4WM, sidebands are generated without gain when the signal wavelength falls in the normal dispersion regime (where the signal wavelength is shorter than the zero-dispersion wavelength).

MI is 4-photon amplification or parametric amplification in which the nonlinear index of refraction is used to phase match the signal and sidebands. For MI the pump wavelength can lie in the anomalous group velocity regime (i.e., where the signal wavelength is longer than the zero dispersion wavelength), and signal and side-bands are co-propagating for proper phase matching.

For some embodiments, the maximum system bandwidth occurs for operation around the zero dispersion wavelength in the fiber. However, for some embodiments of WDM systems this can be wrong when nonlinearities are taken into account. When the system is operated at or near the fiber's zero dispersion wavelength, the signals in adjacent wavelength channels and the amplifier noise travel at similar velocities. Under these conditions, the multiple-wavelength signals and noise have long interaction lengths and can mix.

Chromatic dispersion causes different wavelengths to travel at different group velocities in the transmission fiber. Chromatic dispersion can reduce phase matching, or the propagation distance over which closely spaced wavelengths overlap, and can reduce the amount of interaction through the nonlinear index in the fiber. Thus, in a long transmission system, the nonlinear behavior can be managed by tailoring the dispersion accumulation so that the phase matching lengths are short and the end-to-end dispersion is small. This technique is known as dispersion mapping.

In dispersion mapping, dispersion compensating elements are inserted periodically in the transmission line to undo accumulated dispersion. By using a DMRA, the periodicity of the dispersion compensation can coincide with the periodicity of the amplifier spacing. For WDM systems, the accumulated dispersion can return to zero for a wavelength near the average zero dispersion wavelength for the transmission line. This differing accumulated dispersion for the WDM channels results from the nonzero slope of the dispersion curve. This can be avoided if the dispersion compensating element has the opposite sign of dispersion slope from the transmission fiber. In some embodiments, the accumulated dispersion for the channels away from the balance wavelength can be compensated for with the opposite dispersion at the receiver, such as to minimize signal dispersion.

Dispersion Managed Raman Amplifiers (DMRA's) combine the amplification and dispersion compensating functions by using a dispersion compensating fiber as the gain fiber in a Raman amplifier. The cut-off wavelength of the gain fiber can be adjusted to be shorter than the pump wavelength, so that the pump and signal are single mode. By operating away from the zero dispersion wavelength of the transmission fiber and the gain fiber, dispersion and nonlinearity management can be achieved, since 4WM does not phase match.

The appropriate selection of the gain fiber characteristics can be important in some embodiments. The fiber used in the Raman amplifier can be chosen so that the dispersion at the mean optical wavelength times the length of the amplifying fiber $(D \times L)_{GAIN}$ compensates approximately the dispersion accumulated in the link. One embodiment's compensation can be within 10% of the magnitude of the peak accumulated dispersion value. In other words, in some embodiments $(D \times L)_{GAIN} = -(D \times L)_{LINK}$. The above equation implies several things in some embodiments:

The sign of the dispersion for the amplifying fiber can be opposite to that of the transmission link fiber.

The value of dispersion D in the amplifying fiber can be determined by the operating wavelength and the zero dispersion wavelength in the gain fiber.

The length of the fiber can be adjusted to provide the desired dispersion compensation.

If the transmission fiber is standard fiber, then the gain fiber can potentially lead to efficient Raman gain. So-called DCF (or large negative dispersion fiber) can have a small core size and effective area and significant germanium content in the core, both of which contribute to a larger Raman effect.

In some embodiments, the overall or average dispersion-times-length value over a transmission link segment should be balanced. Different fiber segments can be concatenated within the Raman amplifier to achieve the dispersion compensation.

Since the Raman gain can be a nonlinear process that depends on the pump intensity, gain can be achieved while the pump intensity remains high. The effective length for Raman amplification can be defined as $$L_{\textit{eff}} \equiv \frac{1}{\alpha}[1 - \exp(-\alpha L)]$$

where L is the physical length of the fiber and $\forall$ is the attenuation constant. The attenuation constant given in dB/km can be related to this attenuation constant by $\forall[dB/km]=4.34 \times \forall[km^{-1}]$ Therefore, the effective length for Raman gain can be approximately the distance where the pump intensity drops to half of its intensity at the fiber input. If the net loss at the pump wavelength is around 6–7 dB, then the Raman gain can still be achieved by bi-directionally pumping the fiber or by splitting the fiber in two halves and pumping each half.

For proper loss compensation, the pump power applied to the Raman amplifier can be adequate to make up for the transmission link loss, the gain fiber loss and any associated coupler or splitter losses. For example if the losses are represented as attenuation factors $\forall L$, then net gain given by G can be:

$$G[dB] \exists \forall L_{LINK}[dB] + \forall L_{GAIN\ FIBER}[dB] + \forall L_{COUPLING\ \&\ SPLITTING}[dB].$$

Various embodiments of system designs in transmission systems can use standard and/or DS fiber. One or more of the following assumptions can be made in the Raman amplifiers for some embodiments.

Wavelength. Raman amplifiers are being developed for the violet band, which spans 1430–1530 nm. The blue-violet band is from 1430–1480 nm, and the red-violet band is from 1480–1530 nm. The wavelength of 8=1500 nm can be used in some of the following examples falling near the middle of the red-violet band.

Dispersion for standard single-mode fiber. In one embodiment, standard fiber used is Corning SMF-28, for which the manufacturer provides the dispersion as:

$$D(\lambda) \approx \frac{S_0}{4}\left\{\lambda - \frac{\lambda_0^4}{\lambda^3}\right\}[ps/nm-km] \text{ for } 1200 \leq \lambda \leq 1600 \text{ nm}$$

$8_0$. 1310 nm [nominal]
$S_0$ # 0.092 ps/nm$^2$-km
At 8=1500 nm, D.+14.4 ps/nm-km Other embodiments can use other fibers from Corning, or fibers from other manufacturers.

Dispersion for DS fiber. Some embodiments use Corning SMF/DS for a DSF, for which the manufacturer provides the dispersion as:

$$D(\lambda) \approx \frac{S_0}{4}\{\lambda - \lambda_0\}[ps/nm-km] \text{ for } 1500 \leq \lambda \leq 1600 \text{ nm}$$

$8_0$. 1550 nm [nominal]
$S_0$ # 0.085 ps/nm$^2$-km
At 8=1500 nm, D.-4.25 ps/nm-km Other embodiments can use other fibers from Corning, or fibers from other manufacturers.

Link length. In some embodiments, the amplifier spacing, such as a hut spacing in fiber-optic networks, can be $L_{LINK}$=45 km. Other embodiments use different amplifier spacings.

Gain Fiber. The gain fiber can have a cut-off wavelength shorter than the pump wavelength. Various embodiments can use one or more of the following gain fibers, other fibers with similar dispersion properties, or other fibers with dissimilar properties:

(a) Standard SMF-28 fiber, which can have D=14.4 ps/nm-km at 1500 nm in this embodiment.

Figure 3:
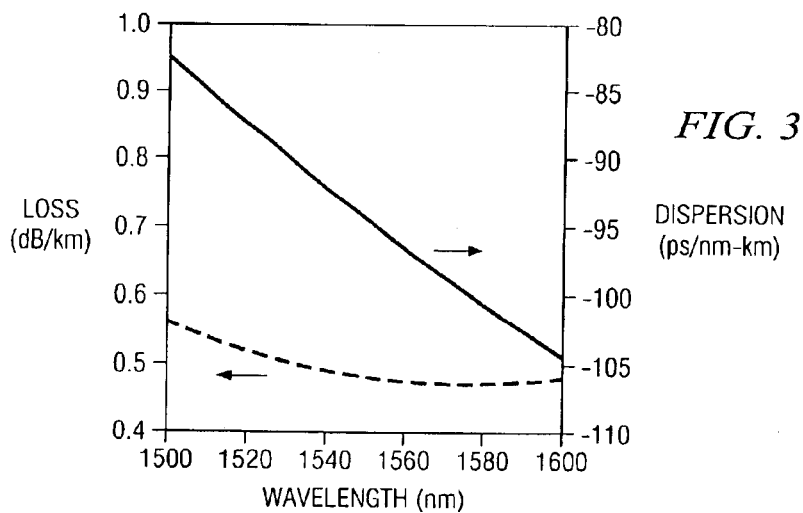
FIG. 3 is a graph showing exemplary dispersion and loss versus wavelength for a dispersion compensating fiber (DCF) with large negative dispersion.

(b) DCF or highly negative dispersion fiber from Lycom. For example, FIG. 3 illustrates the loss and dispersion for an exemplary fiber. In this embodiment, the dispersion at 1500 nm can be about D=−83 ps/nm-km.

One embodiment has a fiber link comprising standard fiber. For a 45 km long link, the total dispersion in the link at 8=1500 nm can be:

$$(D \times L)_{LINK} = (+14.4 \text{ ps/nm-km}) \times (45 \text{ km}) = +648 \text{ ps/nm}.$$

One embodiment has DCF as in FIG. 3 for the gain fiber in the Raman amplifier. The length of the gain fiber can be:

$$L_{LINK} = (D \times L)_{LINK}/(-D_{DCF}) = (648 \text{ ps/mn})/(83 \text{ ps/nm-km}) = 7.8 \text{ km}$$

Other embodiments can use other lengths, such as 1 km.

To calculate the minimum gain required, the insertion loss of the gain fiber and the link loss can be calculated. The loss of the DCF can be approximately $$\forall L_{GAIN} = 0.55 \text{ dB/km} \times 7.8 \text{ km} = 4.3 \text{ dB}.$$

The transmission link loss at 1500 nm can be approximately $$\forall L_{LINK} = 0.22 \text{ dB/km} \times 45 \text{ km} = 9.9 \text{ dB}.$$

Therefore, the pump power can be adjusted to provide at least a gain of $$G > \forall L_{GAIN} + \forall L_{LINK} = 14.2 \text{ dB}.$$

The loss for a pump wavelength of about 1400 nm (i.e., one Raman order above the operating wavelength of 1500 nm) in the gain fiber can be calculated. In the FIG. 3 embodiment, the extrapolated loss value at 1400 nm can be approximately 0.8 dB/km. Therefore, the pump loss in the gain fiber can be about $\forall L_{PUMP} = 0.8$ dB/km×7.8 km=6.24 dB. Since this exceeds the $L_{eff}$ for the nonlinear process, the gain fiber can be pumped bi-directionally, or the two halves of the gain fiber can be pumped separately.

One embodiment has a fiber link comprising Dispersion Shifted Fiber. For an exemplary 45 km long link, the total dispersion in the link at 8=1500 nm can be $(D \times L)_{LINK} = (-4.25 \text{ ps/nm-km}) \times (45 \text{ km}) = -191.25$ ps/nm. With an embodiment including standard SMF-28 fiber for the gain fiber in the Raman amplifier, the length of the gain fiber can be $L_{LINK} = (D \times L)_{LINK}/(-D_{SMF-28}) = (-191.25 \text{ ps/nm})/(-14.4 \text{ ps/nm-km}) = 13.28$ km. Other embodiments can have a length of 1 km.

To calculate the minimum gain required, the insertion loss of the gain fiber and the link loss can be calculated. The loss in the standard fiber can be approximately $\forall L_{GAIN} = 0.22$ dB/km×13.28 km=2.92 dB. The transmission link loss in one embodiment at 1500 nm in the DSF can be approximately $\forall L_{LINK} = 0.25$ dB/km×45 km=11.25 dB. The pump power can be adjusted to provide at least a gain of $G > \forall L_{GAIN} + \forall L_{LINK} = 14.2$ dB.

The loss can be calculated for a pump wavelength of about 1400 nm in the gain fiber. In standard fiber the loss value at 1500 nm can be approximately 0.5 dB/km. In one embodiment the pump loss in the gain fiber can be about $L_{PUMP} = 0.5$ dB/km×13.28 km=6.64 dB. Since this exceeds the $L_{eff}$ for the nonlinear process, the gain fiber can be pumped bi-directionally, or the two halves of the gain fiber can be pumped separately.

Figure 4A:
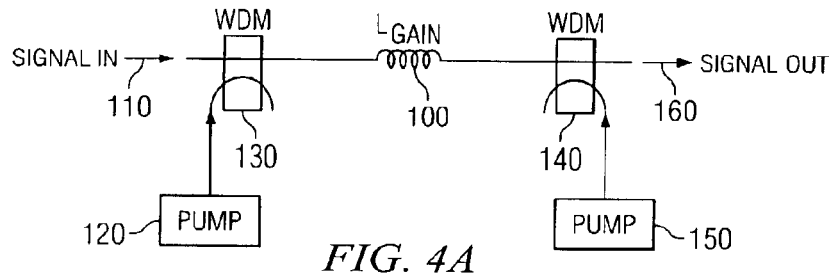
FIG. 4(a) is a schematic view of one embodiment of the present invention which illustrates an open loop configuration for the Dispersion-Managing Raman Amplifier (DMRA) using a bi-directionally pumped gain fiber.
Figure 4B:
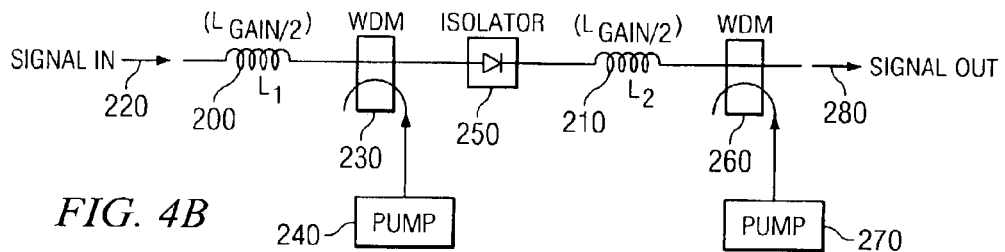
FIG. 4(b) is a schematic view of one embodiment of the present invention which illustrates an open loop configuration for the DMRA with the gain fiber split in two parts and counter-propagation for the pump and signal.
Figure 4C:
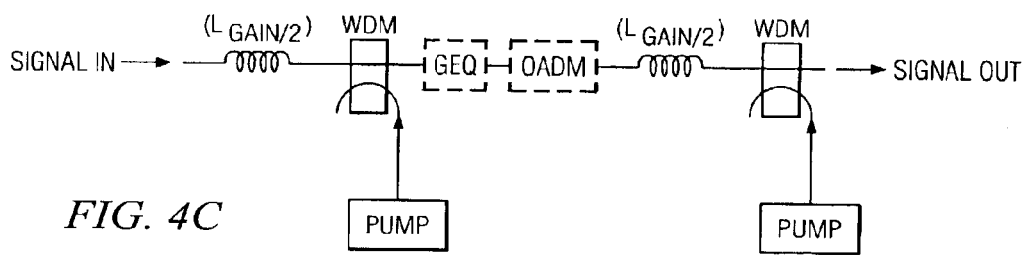
FIG. 4(c) is a schematic view of one embodiment of the present invention which illustrates an open loop configuration for the DMRA and other elements placed between the two segments of the amplifier.
Figure 4D:
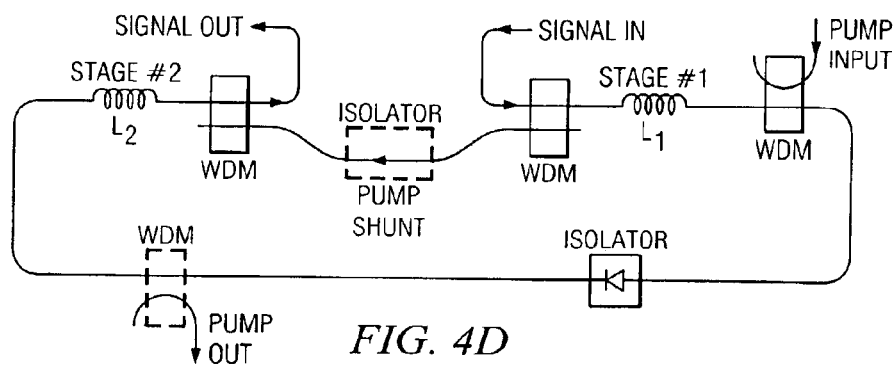
FIG. 4(d) is a schematic view of one embodiment of the present invention which illustrates an open loop configuration for the DMRA with the pump inserted into the first stage counter-propagating and then sent to the second stage of the amplifier.
Figure 4E:
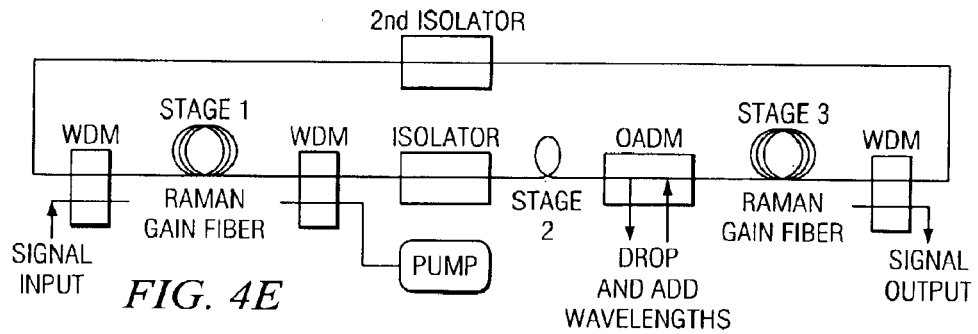
FIG. 4(e) is a schematic view of one embodiment of the present invention which illustrates an open loop configuration for the DMRA with mid-stage elements such as optical add/drop multiplexers.
Figure 4F:
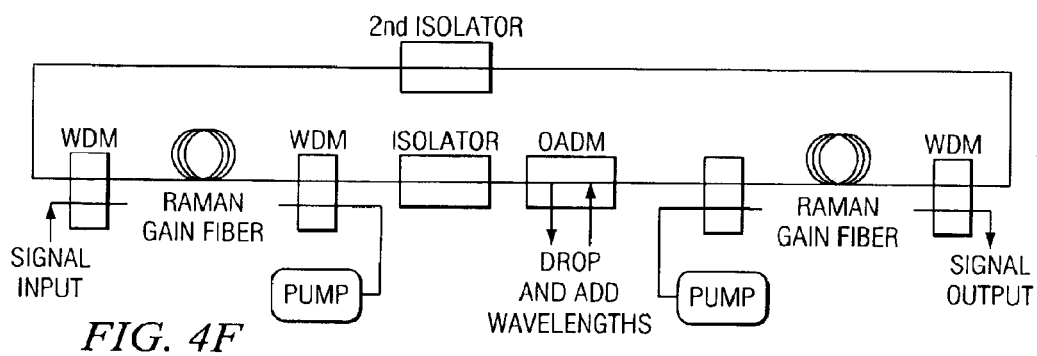
FIG. 4(f) illustrates an embodiment of the present invention similar to FIG. 4(e) with bi-directional pumping used in the second stage to boost the power gain without severe degradation in noise figure for the composite amplifier.

FIG. 4(a)–FIG. 4(f) are schematic diagrams of various embodiments with open loop configurations for the DMRA. In FIG. 4(a), a bi-directionally pumped gain fiber is used. In FIG. 4(b) the gain fiber is split in two parts and the configuration is counter-propagating for the pump and signal. FIG. 4(c) shows that other elements such as gain equalization filters or optical add/drop multiplexers may be placed between the two segments of the amplifier. FIG. 4(d) shows a two-stage amplifier, where the pump is inserted into the first stage counter-propagating and then sent to the second stage of the amplifier. FIG. 4(e) shows another version of a two-stage amplifier with mid-stage elements such as optical add/drop multiplexers. FIG. 4(f) shows bi-directional pumping in the second stage to boost the power gain without severe degradation in noise figure for the composite amplifier.

FIG. 4(a) shows a first embodiment of the invention which uses an open-loop design to provide for the dispersion managing Raman amplifier. The open-loop design can be simple, and may have a high pump power requirement. In the DMRA amplifier of FIG. 4(a), an optical signal is input from an input port 110 to an optical gain fiber 100. The optical gain fiber 100 is pumped bi-directionally by a pumping light generated by a pumping lasers 120 and 150. The gain fiber 100 is single spatial mode at both the signal and pump wavelengths. The amplified signal is then output through an output port 160. The pumps are coupled in through wavelength-division multiplexers (WDM's) 130 and 140, which transmit the signal wavelength but couple over the pump wavelength.

A counter-propagating pump and signal geometry can avoid coupling any pumping light fluctuations to the amplified signal. The open loop configuration of FIG. 4(b) achieves this by splitting the gain fiber into two segments 200 and 210. Two pumps 240 and 270 are used to pump each segment, and WDM's 230 and 260 are used to couple in the pump. In addition, an optical isolator 250 is placed between the two segments to avoid any interference between the pump energy from 270 to 240, which might occur at WDM 230.

In the FIG. 4(b) an isolator is between the two gain segments. In other embodiments other elements can be used between the two gain segments, such as a gain equalization element and/or an optical add/drop multiplexer. Because of the typically high insertion loss associated with add/drop multiplexers, an effective isolation can be achieved between the pumps in the two segments.

An alternate configuration for the gain fiber pumping is also illustrated in FIG. 4(d). Other embodiments use an isolator with a pump shunt around the isolator. Another embodiment is illustrated in FIG. 4(d). Here, the gain fiber is split into two lengths. The pump is introduced into a first fiber. The pump is shunted around where the signal is introduced and extracted. Then the pump enters the second gain fiber. An optional WDM may be used to remove any remaining pump, so as to avoid damage to the isolator. The isolator can be placed between the two gain fibers. This configuration can be characterized by one or more of the following:

1. the first stage can be a low-noise pre-amplifier;
2. the isolator in the signal path further reduces noise;
3. the second stage can be a power amplifier, depleting pump power;
4. a better noise figure since weak signal sees higher gain;
5. better gain saturation performance; and
6. prevention of double Rayleigh scattering At the mid-stage of the two-stage amplifier other elements such as add/drop multiplexers can also be placed. FIG. 4(e) illustrates a two-stage design with an optical add/drop multiplexer at the mid-stage. The configurations of FIG. 4(d) and FIG. 4(e) may also be used in embodiments where dispersion compensation fiber is not used as the gain fiber. Bi-directional pumping in the second stage of the two-stage amplifier can increase the power amplifier gain without severely impacting the noise figure of the composite amplifier, as in FIG. 4(f).

Figure 5:
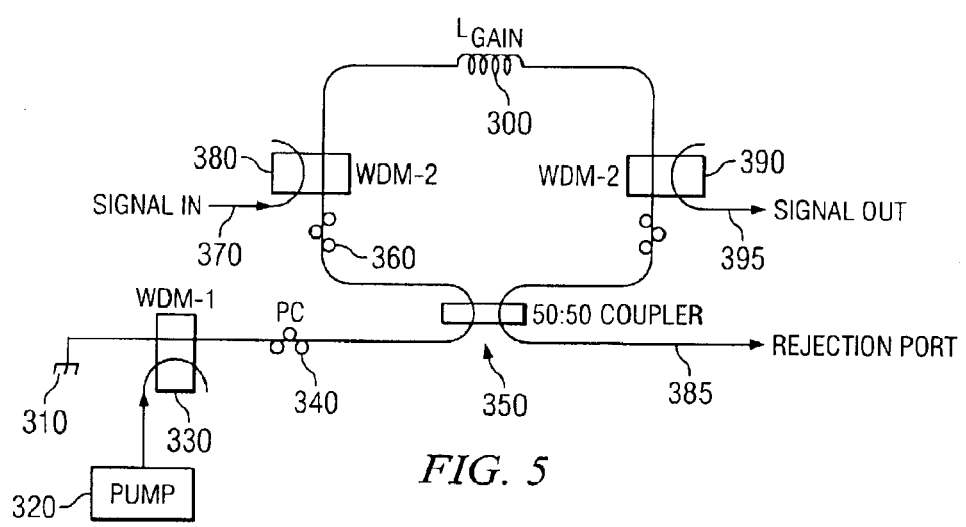
FIG. 5 is a schematic view of an embodiment that depicts a DMRA based on a Sagnac Raman cavity.

To reduce the pump power requirements, a broadband cavity such as the Sagnac Raman cavity can be used. FIG. 5 illustrates an embodiment of the DMRA that uses a Sagnac Raman cavity design with a bi-directional pumping. Referring to FIG. 5, the Sagnac Raman cavity of the DMRA is formed by a broadband mirror 310 and a loop mirror comprising a Raman gain fiber 300 and an optical coupler 350 connected thereto. The Sagnac Raman cavity design is described in U.S. Pat. No. 5,778,014, and this patent is incorporated herein by reference. An optical signal 370 is input through an input port 380 to the Raman gain fiber 300. A pumping laser 320 generates a pumping light that pumps the fiber 300 through a coupler 330. The optical signal is amplified and then outputs through an output port 390. Note that in this configuration the pumping can be bi-directional for the gain fiber 300.

The Sagnac DMRA may further include a polarization controller 360 in the Sagnac Raman cavity for controlling polarization state. However, if the fiber is polarization maintained, the polarization controller can be excluded or included. The optical coupler 350 is nominally 50:50 at least between the pump and one Raman order below the signal wavelength. The coupler 330 is a WDM coupler that transmits the signal and intermediate Raman orders but couples over the pump. The input port and output port can comprise a WDM coupler that transmits the various pump orders, but couples over the signal. The Sagnac Raman cavity can have a passive noise dampening property that leads to quieter cascading of various Raman orders. Difference frequency noise can be output through the rejection port 385.

Figure 6:
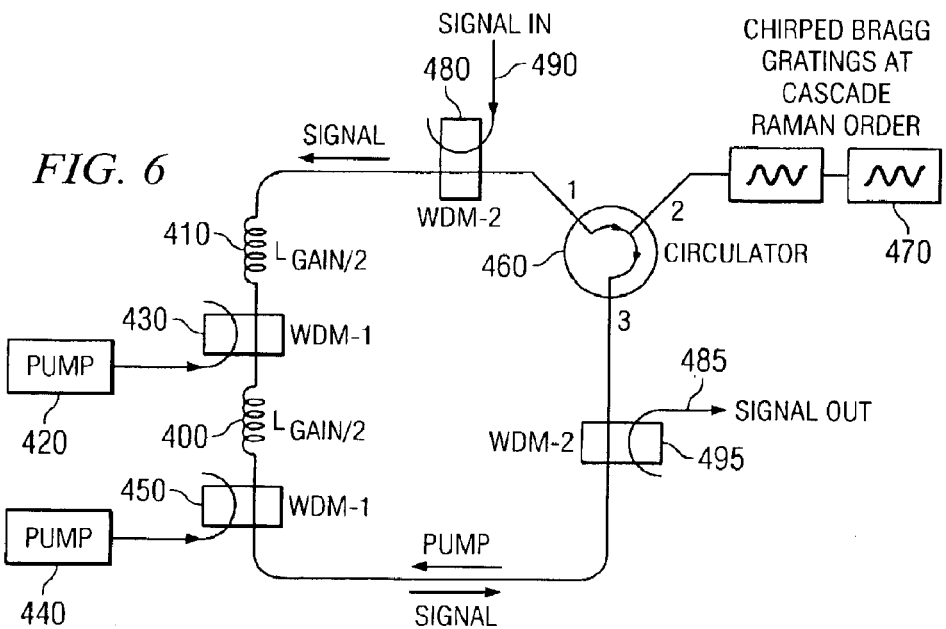
FIG. 6 is a schematic view of an embodiment that depicts yet another design of a DMRA based on a circulator loop cavity with chirped Bragg gratings.

Another embodiment of the DMRA uses a circulator loop cavity with chirped fiber gratings, as in FIG. 6. The circulator loop cavity design is described in the above-noted U.S. patent application entitled "Chirped Period Gratings for Raman Amplification in Circulator Loop Cavities". This patent application is incorporated herein by reference. The signal and cascade Raman pumps can be counter-propagating, reducing cross-talk. The chirped Bragg gratings 470 can be introduced into the loop for wavelength control. The chirped Bragg gratings provide broadband reflection at the various Raman cascade orders. Thus, the wavelengths for the various cascade Raman orders are selected, and broadband enough reflection can be provided to permit broadened bandwidth at each subsequent cascade order.

The chirped Bragg gratings 470 permit tailoring the bandwidth at the various Raman orders while reducing the fiber insertion loss. Some embodiments have gratings with bandwidths as large as 40–50 nm. Adjusting the length and variation in periodicity of the grating can control the bandwidth. The Bragg condition at the center of each of the gratings can be made to coincide with the maximum gain wavelengths of the cascade Raman orders. Fiber Bragg gratings can operate in reflection mode. The gratings can be introduced into port 2 of the circulator 460.

Optical circulators 460 can be non-reciprocal devices that redirect light from port to port sequentially in one direction. Input from port 1 is redirected to port 2. A reverse signal entering port 2 transmits to port 3 as a usable signal. Ports 1 and 3 can be completely isolated. Optical circulators can be 3-port coupling devices made to be polarization independent and with low insertion loss. Optical circulators can be based on optical isolator technology.

The circulator 460 should be broad band enough to operate at the pump and cascade Raman order wavelengths. Two ports of the circulator (ports 1 and 3) are connected by lengths of Raman gain fiber 400 and 410. This Raman gain fiber possess one or more attributes of dispersion compensation. The gain fiber is split into two segments, each of which can be pumped effectively. The pumps 420 and 440 at wavelength $\lambda_p$ are introduced in the clockwise direction using WDM couplers 430 and 450. These couplers should transfer over the pump wavelength while passing through the cascade Raman orders and the signal wavelength. The pump and various cascade Raman orders circulate in the clockwise direction around the loop.

The signal traverses the circulator loop in the counter-clockwise direction, opposite to the pump and the various cascade Raman orders. The signal 490 is introduced at one end of the Raman gain fiber using a WDM 480 and removed from the other end of the fiber using WDM 495. These WDM's should transfer over the signal wavelength, while passing through the pump and the cascade Raman orders.

In some embodiments with multi-wavelength WDM channels, gain equalization can be included at the output of the amplifier. In the embodiment of FIG. 4(c), the gain equalization can be performed at the mid-stage access in a two-section gain fiber. This wavelength dependency or non-uniformity of the gain band may have little impact on single-channel transmission, and may render the amplifier unsuitable for multi-channel operation through a cascade of amplifiers. As channels at different wavelengths propagate through a chain of amplifiers, they accumulate increasing discrepancies between them in terms of gain and signal-to-noise ratio. Gain-flattening elements can significantly increase the usable bandwidth of a long chain of amplifiers. For example, the DMRA can be followed by a gain flattening element to provide gain equalization for different channels (c.f. FIG. 1).

Figure 7A:
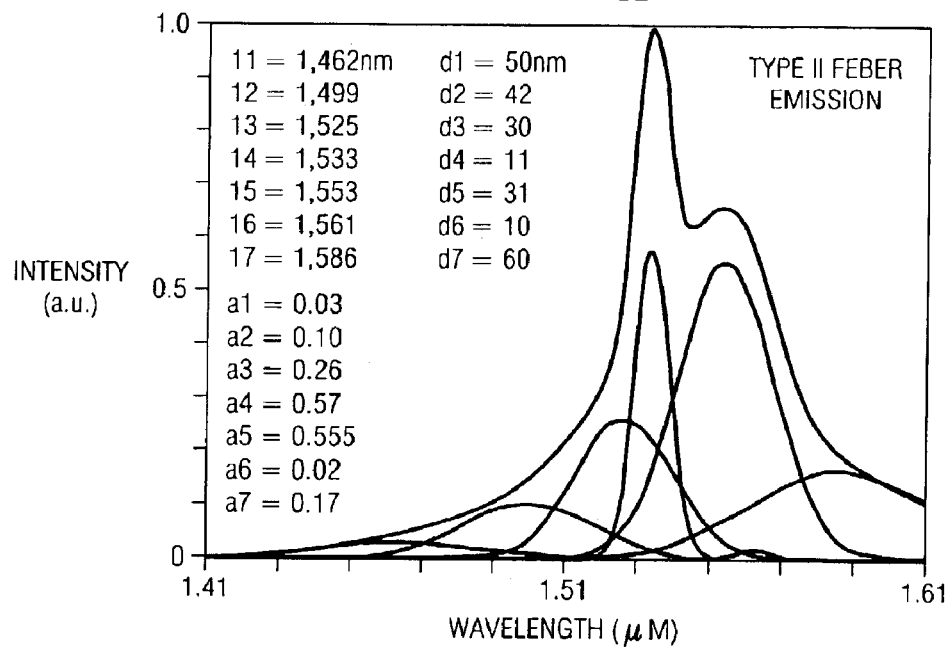
FIG. 7(a) is a graph showing a fit of the EDFA band with five Gaussian functions.
Figure 7B:
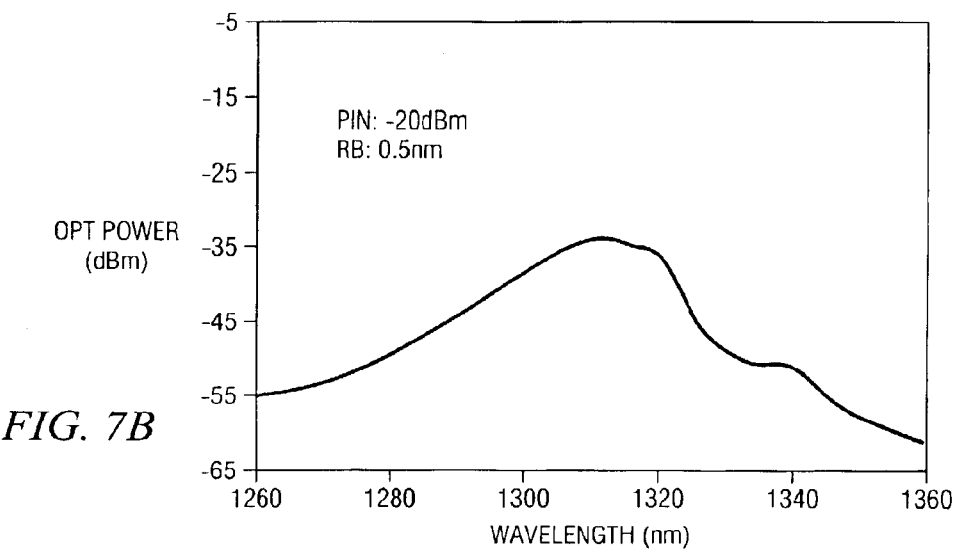
FIG. 7(b) is a graph showing a fit of the Raman gain band with two Gaussian functions.

The difficulty of implementing the gain flattening element can relate to the complexity of the required filter function, which can be characterized by the number of Gaussian and/or Fourier terms needed to fit the gain spectrum. For example, in one embodiment the EDFA gain band requires five Gaussian terms to fit the useable band (FIG. 7(a)). In one embodiment, the Raman gain spectrum (FIG. 7(b)) can be smoother, and can approximately be fit using two Gaussian terms. In some embodiments, gain equalization for Raman amplifiers can be simpler than for EDFA's.

There are at least four approaches for gain flattening filter types. The approaches include Mach-Zehnder interferometers, lattice devices, dielectric filters, and long period gratings.

1. Mach-Zehnder interferometers can be used in some embodiments for simple functions, and may be useful for red or blue band filters, and may be less useful for notch or broad band filters. Mach-Zehnder interferometers can be cheap and easy to make.

2. Lattice devices can comprise a series of couplers and delay lines, and can fit notch filters and the broad band erbium spectrum using a Fourier series.

3. Dielectric filters can make broad band and notch filters possible, and may be like Fourier series.

4. Long period gratings can make broad band and notch filters possible, and may be like Gaussian series.

The gain equalizer element 60 in FIG. 1 can be implemented using one or more of the above approaches.

Transmission systems based on conventional DS fiber with a zero dispersion wavelength of about 1550 nm can face major difficulties when upgrading their capacity using multiple WDM channels and EDFA's. The gain band for EDFA's spans about 1535–1565 nm. The flattened gain section can be between 1540–1560 nm. Some of the useful bandwidth of EDFA's can be unavailable for WDM upgrades when using DSF in the transmission links.

In some embodiments, WDM systems can be implemented in transmission systems based on DSF by moving to the "violet band"(i.e., 1430–1530 nm), away from the zero dispersion wavelength. Raman amplifiers can be used to provide gain in this wavelength window. Because of the finite negative value of dispersion for DSF in the. violet band, the major nonlinearity penalties for WDM systems can be managed. 4WM might no longer phase match due to the finite dispersion value. MI can be avoided in the transmission link since operation can be in a normal dispersion regime, such as D<0.

DMRA's may allow the transmission line to be dispersion managed. Dispersion management refers to transmission systems where the local dispersion is high, so as to avoid 4WM, while the average dispersion over the link is approximately zero, so as to avoid dispersive pulse broadening. In dispersion management, the transmission line dispersion can vary in sign between positive and negative values, allowing cancellation of the accumulated dispersion over a given transmission span. In an embodiment of a transmission system based on DSF, DMRA's can provide dispersion management by using as the gain fiber standard dispersion fiber. This embodiment can reduce the cost of the gain fiber.

Figure 8A:
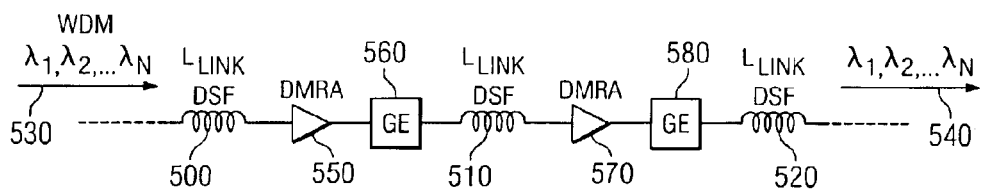
FIG. 8(a) is a schematic view of an embodiment showing an exemplary dispersion-managed WDM transmission system where the transmission fiber is based on DS fiber.
Figure 8B:
FIGS. 8(b) and 8(c) are graphs showing accumulated dispersion of an exemplary dispersion-managed WDM transmission system where the transmission fiber is based on DS fiber.
Figure 8C:
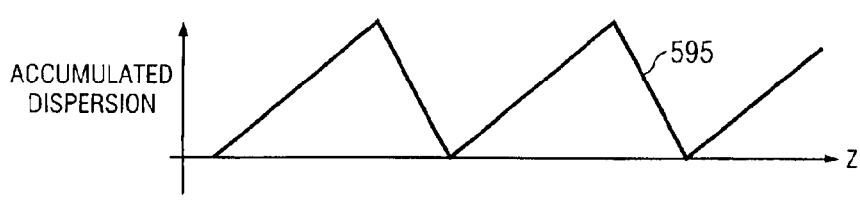

Various embodiments of a dispersion managed WDM transmission system with DSF links are illustrated in FIG. 8(a)–FIG. 8(c). The input 530 and output 540 signals are multiple wavelength WDM channels, which can be spaced uniformly by 100 GHz (or 0.8 nm). The transmission line can be periodic with segments including a link of DSF 510 and a DMRA 570. In one example, the DMRA is assumed to operate in the violet band between 1430–1530 nm, and the gain fiber conveniently has standard dispersion. Gain equalizers 580 can also be placed periodically within the transmission line. In one embodiment, gain equalizers can be one or two stages of Mach-Zehnder interferometers. The gain equalizers can be included along with each DMRA.

FIG. 8(a)–FIG. 8(c) also illustrate the dispersion and nonlinearity management. The local dispersion can be negative in the transmission link but positive in the DMRA's. With the proper selection of dispersion compensating fiber for the DMRA, the accumulated dispersion can be made to balance in each transmission segment at the middle of the WDM wavelength band.

As bandwidth utilization of the fiber increases, gain tilt across the band due to energy exchange arising from the Raman effect can be a concern. The Raman effect shifts energy from shorter wavelengths to longer wavelengths. The Raman gain increases approximately from zero frequency difference up to its peak at about 13.2 THz (or about 100 nm around a wavelength of 1550 nm). The Raman effect can be important for WDM channels spaced from little frequency difference up to about 13.2 THz frequency separation, and the magnitude of the energy exchange for CW channels can increase with increasing frequency separation. Raman gain tilt can become increasingly important as new wavelength bands are added. A first order effect from Raman can be energy exchange, and a second order effect might be channel cross-talk.

Some embodiments of fiber-optic transmission systems for long-haul use the erbium-doped fiber amplifier (EDFA). The conventional band (C-band) for EDFA's is roughly 1530–1565 nm. As several spans are cascaded and the number of wavelengths is increased, the influence from Raman gain tilt (i.e., less gain at shorter wavelengths and more gain at longer wavelengths) can be observed. The tilt can worsen as the system bandwidth is increased.

As the demand for bandwidth continues to rise, a new wavelength band can be added: the long-wavelength or L-band. This L-band spans roughly 1565–1610 nm, so the resulting total bandwidth between the C- and L-bands can be about 80 nm. The wider wavelength range begins to approach the peak of the Raman gain. The addition of the new band can result in a significant Raman gain tilt across the already deployed C-band.

One or more of the following bands can be used: "blue band"—1530 to 1545 nm in C-band; "red-band"—1545 to 1560 nm in C-band; and "high-band"—1570–1605 nm in L-band. Other bands can be used.

New bands can be introduced without requiring changes in and minimizing the impact on the existing bands. Due to the Raman effect, existing C-band EDFA's should be retrofitted with devices for providing adjustable gain tilt. Since the gain tilt will depend on the number of channels, the channel spacing, the span length, and the overall bandwidth, having an adjustable gain tilt can be valuable. Some embodiments add new bands while minimizing the changes in the existing C-band. New "knobs" can be incorporated into the new bands being added. New features can be required from existing bands.

In one embodiment, changes can be minimized in the C-band by symmetrically adding channels or bands to both the short and long wavelength side of the C-band. Longer wavelength channels may remove energy from the C-band, and shorter wavelength channels can replenish the energy. Although the slope of the gain tilt depends on the net power, the symmetric addition of bands can move the zero-crossing or fulcrum of the gain changes to the center of the C-band More specifically, the following bands can apply to the deployed fibers and their low-loss window:
$S^+$-band: 1430–1480 nm
S-band: 1480–1530 nm
C-band: 1530–1570 nm
L-band: 1570–1610 nm EDFA's exist for the C-band and L-band. For the shorter wavelength S-band and $S^+$-band, Raman optical amplifiers can be used. Adding channels symmetrically placed in frequency or energy around the C-band (i.e., one channel in the L-band and a symmetric channel in the S-band), can minimize effects from the Raman gain tilt on the C-band.

The S-band can require more gain from the optical amplifier than just to compensate loss because of the Raman energy exchange. Less gain from the L-band optical amplifier than just to compensate loss can be required due to the Raman energy exchange.

Digital systems can require a signal-to-noise (SNR) ratio of about 20 dB for 2.4 Gb/s systems. The same SNR can be required for all three bands. The higher gain required in the S-band can place additional demands on the S-band optical amplifier. Higher gain can mean more noise (i.e., amplified spontaneous emission) that adversely affects the SNR. One embodiment maintains the same SNR in the S-band and C-band by reducing the bit rate in the S-band. In another embodiment, the same SNR can be maintained by using an optical amplifier with a lower noise figure (NF) in the S-band than in the C-band.

The C-band and L-band can use EDFA's for the optical amplifiers. The S-band can use Raman amplifiers. A Raman amplifier can have a lower noise figure than an EDFA because it is a four-level like system. The noise figure is proportional to $N_2/(N_2-N_1)$, where $N_2$ is the upper level carrier density and $N_1$ is the ground state carrier density. This parameter can be greater than unity for an EDFA, and can be approximately equal to one in a Raman amplifier.

Another embodiment achieves an improved NF for the S-band by using distributed Raman amplification.

The symmetric addition of new channels around the C-band can solve the first-order impact of the Raman effect—namely, the gain tilt resulting from energy exchange. There may also be secondary effects from inter-channel interference. These secondary terms can be kept small by insuring sufficient dispersion between channels, so that there is adequate walk-off between channels to reduce any pattern dependent cross-talk.

Nonlinearity impairments from 4WM and Raman gain tilt can become increasingly important as new bands are added and the channel count increases. In some embodiments, these nonlinearity impairments can be minimized by reducing the power per wavelength channel. Distributed Raman amplification can achieve this in some embodiments without degradation of the signal-to-noise ratio at the receiver. Distributed Raman amplification can be achieved in some embodiments by pumping the fiber composing the transmission line with a Raman oscillator or laser diodes. The pump light produces Raman gain for the signal using the inherent Raman gain in the transmission fiber. Since the gain is inherent to the transmission line, existing fiber-optic systems can be upgraded.

The power per channel can be reduced because distributed Raman amplification cancels or compensates for the loss in the fiber. The distributed Raman gain can have an effectively better noise figure than its discrete amplifier counterparts. The channel power can be lowered to the point that nonlinearities become insignificant. For example, in one embodiment, a transmission system at a power of 0 dBm (1 mW) is used at OC-48 or 2.5 Gb/s and 6 dBm (4 mW) at OC-192 or 10 Gb/s per channel. With the addition of distributed amplification, OC-192 systems can have power per channel as low as −13 dBm (0.05 mW).

Distributed Raman amplification can also help in gain control or gain clamping. It can be undesirable to have the gain level change when channels are added or dropped, such as when optical add/drop multiplexers are used. This gain clamping problem can be solved in some embodiments by using distributed Raman amplification because the power per channel can be significantly reduced. The lower power can insure that there will be negligible gain or pump depletion. The combination of lower power per channel and negligible gain depletion can provide an effective gain clamping.

Figure 10:
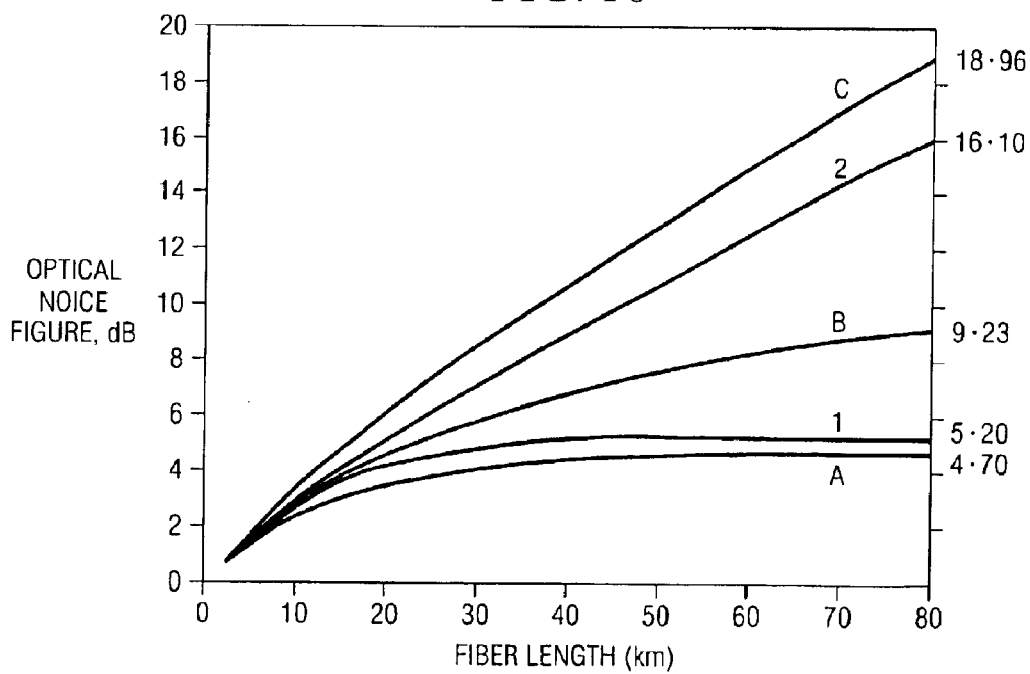
FIG. 10 is another graph showing the calculated optical noise figure versus fiber length for different cases.
Figure 11:
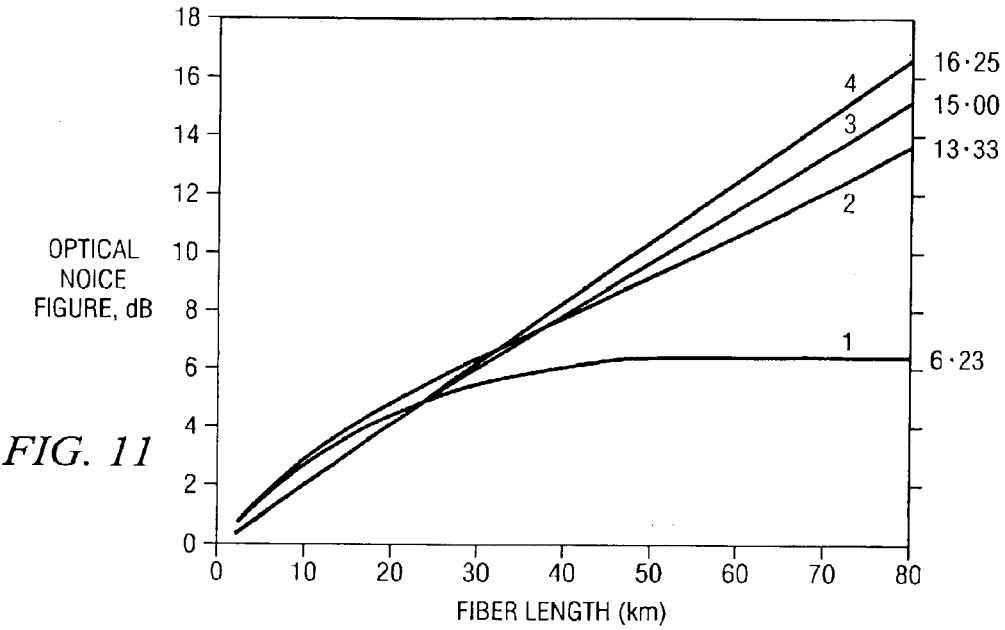
FIG. 11 is a graph showing optical noise figure versus fiber length for different kinds of distributed Raman amplifiers.

Distributed Raman amplification can improve the effective noise figure of the amplifiers in a transmission line. Noise figures of various embodiments for different amplification schemes are shown in FIGS. 9–11, as a function of transmission length (i.e., length of a period in periodically amplified systems).

Closed form solutions can be derived for different attenuation constants and for the bi-directional pumping case with variable intersection of the forward and backward pumps. The attenuation constants for the forward and backward pumps can be different from that of the signals.

Figure 9:
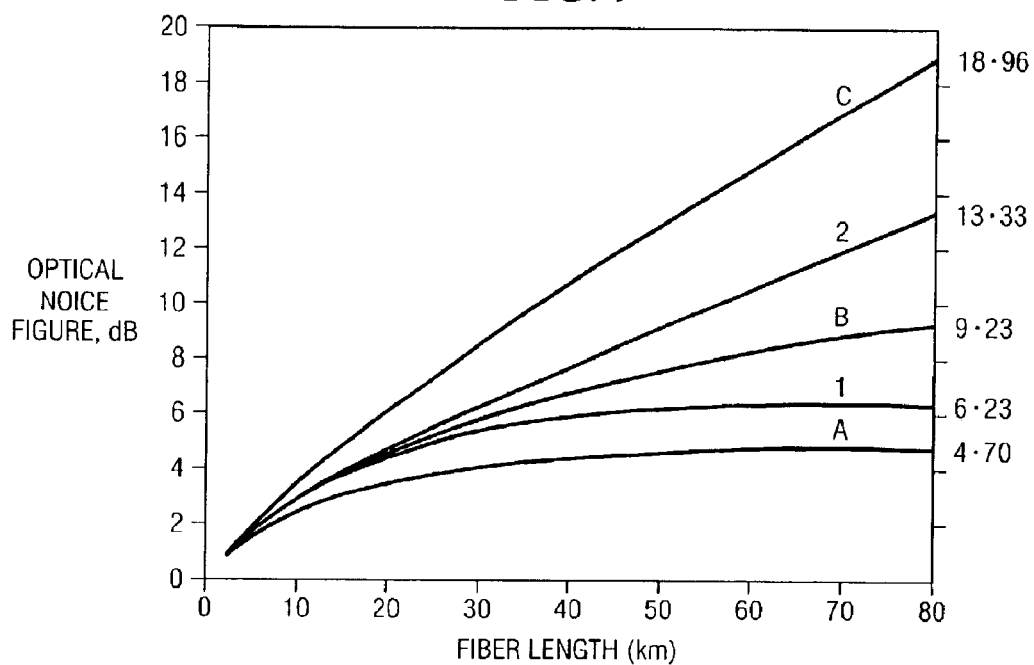
FIG. 9 is a graph showing the calculated optical noise figure versus fiber length for different cases.

FIG. 9 includes graphs where the attenuation constants for the signal and the pump are 0.2 dB/km. A line length can be 80 km. Curves A and C are for lumped amplifiers. In curve A, the amplifier is at the beginning, followed by the line, or fiber. In curve C, the line, or fiber, is followed by the amplifier. Curve B shows uniformly distributed amplification, or with a uniformly distributed amplifier. Curve 1 shows forward distributed Raman pumping, or with a forward pumped Raman amplifier. Curve 2 shows backward distributed Raman pumping, or with a backward pumped Raman amplifier. FIG. 10 is similar to FIG. 9, with a pump attenuation constant of 0.5 dB/km and a signal attenuation constant of 0.2 dB/km.

Curve A has the lowest noise figure and curve C has the highest (at 80 km line 4.7 dB and 18.96 dB, respectively). The uniform distributed gain gives a noise figure (curve B) of 9.23 dB at 80 km length, which is between curves A and C. With the amplifier first (curve A), the noise introduced by the amplifier is also attenuated by the fiber transmission, while in curve C the noise is introduced at the end. When the pump attenuation constant increases to 0.5 dB/km from 0.2 dB/km, the noise figures for the forward Raman pump go down to 5.20 dB from 6.23 dB, but for the backward Raman pump it goes up from 13.33 dB to 16.10 dB. As the pump attenuation is increased, the distributed amplifier can approach more closely the discrete amplifier case.

FIG. 11 shows graphs of noise figures for (1) a forward pumped Raman amplifier, (2) a backward pumped Raman amplifier, (3) a bi-directional pumped Raman amplifier, and (4) another bi-directional pumped Raman amplifier. Curves (1), (2), and (3) have pump and signal attenuation constants of 0.2 dB/km, and curve (4) has a pump attenuation constant of 0.5 B/km and a signal attenuation constants of 0.2 dB/km. For the bi-directional cases, the intersection of the forward and backward pumps may be at about the middle of the line section. The noise figures for the four plots at the 80 km section are 6.23, 13.33, 15.00 and 16.25 dB. The plots show that at large distances the noise figures for the bi-directional cases may be larger than that of the backward pump case. If the line length is small (below 40 km), some improvement is possible over the backward pumped case. Bi-directional pumping can have two advantages (in addition to the possibility of improved noise figure): (1) reduced input pump power at both fiber ends; and (2) a more uniform medium inversion along the fiber, which can be particularly important at high-bit rates using short pulses.

In broadband distributed Raman amplification, the non-linear interaction between pumps for different bands can be minimized by spatially dispersing alternate band pumps and/or by cross-polarizing alternate band pumps. As an example, consider a periodically amplified system with discrete amplifiers placed every $L_{amp}$. In one embodiment, the amplifier spacing may be on the order of $L_{amp}$=80 km. In some embodiments, there may be access at some intermediate point, which may be about half-way between amplifiers. Distributed Raman amplification can be added by using Raman oscillators or laser diodes to pump the transmission line. There may be a number of bands that need to be amplified.

$8_i$=Raman pump wavelengths for gain in band i (may be more than one pump wavelength)

$8_j$=Raman pump wavelengths for gain in band j (may be more than one pump wavelength)

i,k,m . . . one set of pump bands j,l,n . . . alternate set of pump bands (i.e., interleaved from above set).

Figure 12A:
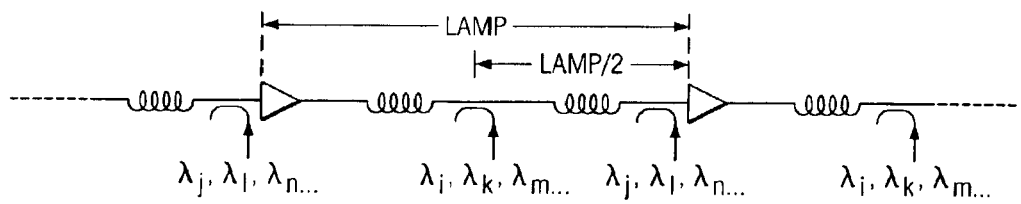
FIGS. 12(a)–12d are schematic diagrams of embodiments showing hybrid systems of discrete and distributed amplifiers.
Figure 12B:
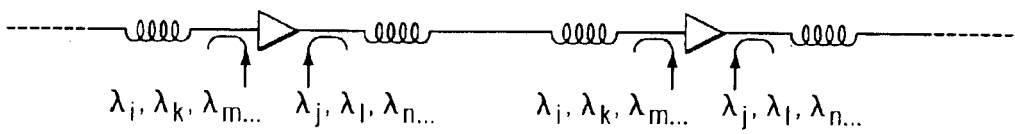
Figure 12C:
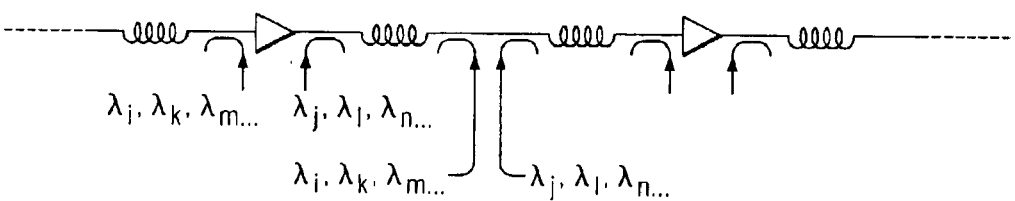
Figure 12D:
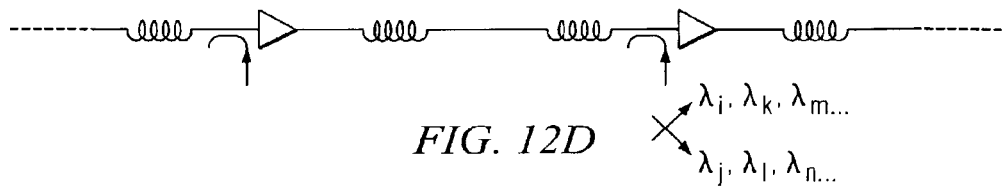

FIG. 12(a)–FIG. 12(d) show different configurations hybrid systems of discrete and distributed amplifiers, such as for adding Raman pumps for different wavelength bands. FIG. 12(a) shows an embodiment where distributed amplification is added with counter-propagating Raman pumps, assuming that access at the mid-point stage exists. Alternate band pumps are added at different spatial points to minimize nonlinear interaction between pumps. FIG. 12(b) shows an embodiment where mid-span access is not available, but bi-directional pumping is allowed. Alternate band Raman pumps can be launched in different directions to minimize interaction between pumps. FIG. 12(c) shows an embodiment where bi-directional pumping is allowed and mid-stage access is available. A more uniform pumping can be achieved. FIG. 12(d) shows an embodiment where counter-propagating pumps are allowed and there is no mid-stage access. The alternate pump bands can be launched orthogonally polarized. This embodiment can take advantage of the fact that the Raman gain for cross-polarized light is about one-tenth the strength of Raman gain for co-polarized light. Polarization multiplexing can be combined with other embodiments, such as the embodiments of FIG. 12(a)–FIG. 12(c).

Figure 13A:
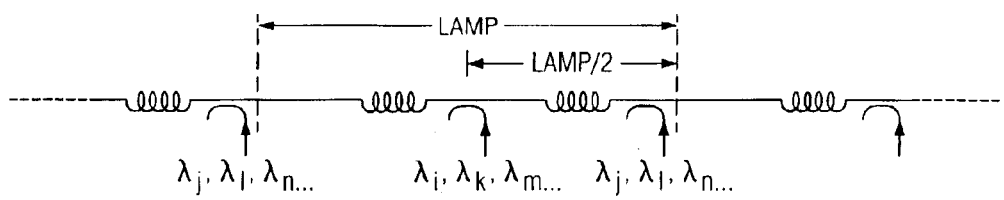
FIGS. 13(a)–13(d) are schematic diagrams of embodiments showing distributed Raman gain.
Figure 13B:
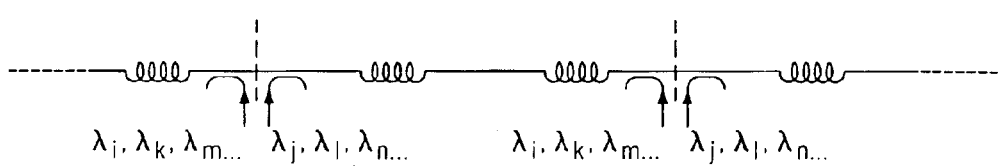
Figure 13C:
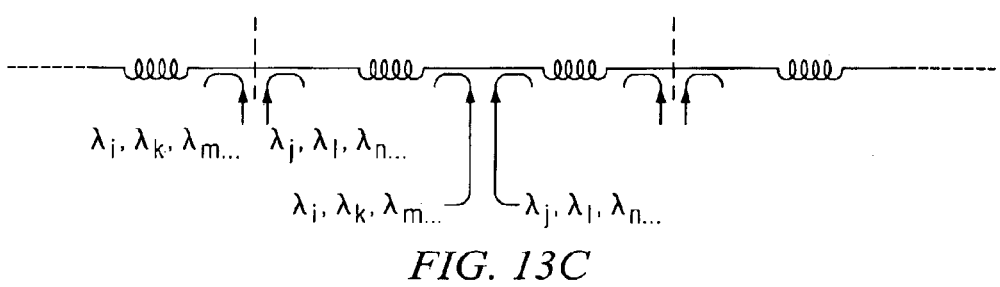
Figure 13D:
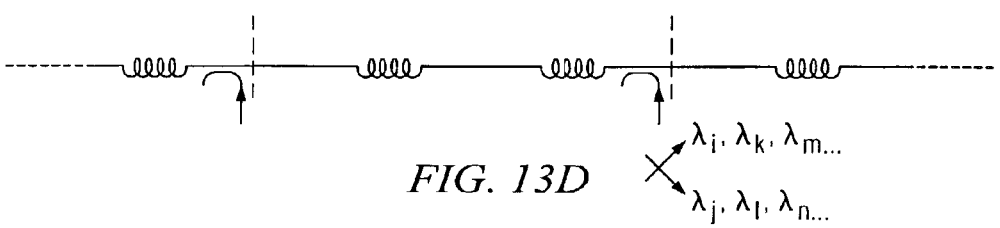

FIGS. 13(a)–13(d) are schematic diagrams of pumping configurations for distributed Raman gain, or amplification, such as with a periodically amplified system with a period of $L_{amp}$. FIG. 13(a) shows an embodiment with a counter-propagating pumping scheme with mid-stage access. Alternate pump bands can be spatially dispersed. FIG. 13(b) shows an embodiment with bi-directionally pumping without mid-stage access. Alternate pumps can be launched in different directions. FIG. 13(c) shows an embodiment with a combination of bi-directional pumping and mid-stage access, with a result that the gain can be more spatially uniform. FIG. 13(d) shows an embodiment with a launch of alternate pump bands cross-polarized. Cross-polarized pumps can be combined with other embodiments, such as embodiments in FIG. 13(a)–FIG. 13(c).

Figure 14:
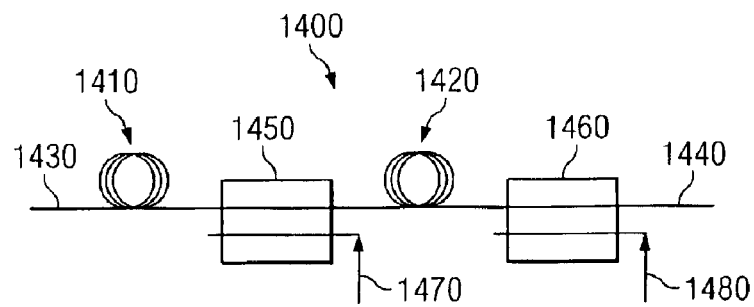
FIG. 14 is a schematic diagram of an embodiment showing a configuration of an all band amplifier of the present invention.

FIG. 14 is a schematic diagram of an all band Raman amplifier 1400. The Raman amplifier 1400 can include an optical transmission line having an input to receive an optical signal 1430 and an output to pass the optical signal 1440. The optical signal can include a band of wavelengths, and propagates in a upstream direction from the input to the output. The band of wavelengths of the optical signal can include a continuous range of wavelengths, or a plurality of ranges of wavelengths.

The optical signal can have a wavelength range $\lambda_S$ of 1400 to 1650 nm, or 1430 to 1630 nm. The optical transmission line can comprise Raman gain fibers 1410 and 1420, and WDMs (wavelength division multiplexers) 1450 and 1460. A length of each Raman gain fiber 1410 and/or 1420 can be at least 200 m, or at least 1 kilometer. Shorter signal wavelengths can receive more gain in the Raman gain fiber 1420 than in the Raman gain fiber 1410. One, or both of the Raman gain fibers 1410 and 1420 can include dispersion compensating fiber. A lossy member can be positioned between the Raman gain fibers 1410 and 1420. The lossy member can include at least one of an add/drop multiplexer, a gain equalization element, an optical isolator or a dispersion compensating element.

WDM 1460 receives a first set of pump wavelengths 1480 provided by a first pump source and couples the first set of pump wavelengths 1480 to the Raman gain fiber 1420. The Raman gain fiber 1420 and the first pump source define a second section. The WDM 1450 receives a second set of pump wavelengths 1470, which can provide gain to the optical signal and extract optical energy from at least a portion of the first set of pump wavelengths 1480, and are provided by a second pump source coupled to the Raman gain fiber 1410. The Raman gain fiber 1410 and the second pump source define a first section. The Raman amplifier 1400 can include a third section including a third Raman gain fiber coupled to a third pump source. One, or more of the pump sources can include at least one laser diode pump source.

A length of each section can be controllable to adjust gain flatness of the Raman amplifier gain as a function of optical signal wavelengths. The WDM 1450 can substantially pass signal wavelengths as well as at least a portion of the first set of pump wavelengths 1480 between Raman gain fibers 1410 and 1420. Substantially passing signal wavelengths will be understood to mean that at least a majority of the power passes between Raman gain fibers 1410 and 1420. The WDM 1460 can be configured to substantially pass the optical signal between Raman gain fiber 1420 and output 1440. The second set of pump wavelengths 1470 includes one or more wavelengths greater than one or more wavelengths of the first set of pump wavelengths 1480. The first and second sets of pump wavelengths 1470 and 1480 can collectively produce a wavelength range $\lambda_p$ which can be 1250 nm to 1550 nm, or 1300 nm to 1530 nm. The first and second sets of pump wavelengths 1470 and 1480 can propagate in a downstream direction towards the input in the transmission line.

A majority of the pump wavelengths 1470 and 1480 can have powers within 50% of each other, or within 30% of each other. The optical transmission line receives an optical signal in 1430 and provides an optical signal out 1440. The optical signal in can be received by the input of the optical transmission line. The optical signal out can be passed by the output of the optical transmission line. A gain flatness of the Raman amplifier 1400 can be optimized by a gain flattening filter, and/or by pump wavelengths, pump powers,the number of pumps and the lengths of Raman gain fibers 1410 and 1420.

Another embodiment is an optical amplifier. The optical amplifier can include an optical fiber having a signal input port and an optical signal output port. The optical fiber comprises at least a Raman gain fiber and a second Raman gain fiber. A length of each Raman gain fiber can be at least 200 m, or at least 1 kilometer. Shorter signal wavelengths can receive more gain in the second Raman gain fiber than in the Raman gain fiber. One, or more of the Raman gain fibers can be dispersion compensating fiber. A lossy member can be positioned between the first and second Raman gain fibers. The lossy member can be an add/drop multiplexer, a gain equalization element, or a dispersion compensating element. The optical fiber can be configured to be coupled to at least one optical signal source that produces an optical signal which can include a band of wavelengths. The band of wavelengths of the optical signal can include a continuous range of wavelengths, or a plurality of ranges of wavelengths. The optical signal travels in a direction. The optical signal can have a wavelength range $\lambda_s$ of 1400 to 1650 nm, or 1430 to 1630 nm.

The optical amplifier can include a WDM positioned between the second Raman gain fiber and the output port. The WDM can be configured to be coupled to a first pump source producing a first set of pump wavelengths and can be configured to substantially pass the optical signal. The optical amplifier can comprise a second WDM, positioned between the Raman gain fibers, which can be configured to substantially pass the optical signal and at least a portion of the first set of pump wavelengths, and which can be configured to be coupled to a second pump source producing a second set of pump wavelengths.

The second set of pump wavelengths can provide gain to the optical signal and extract optical energy from at least a portion of the first set of pump wavelengths. In one embodiment, at least a portion of the first set of pump wavelengths are different than the second set of pump wavelengths, and the first and second set of pump wavelengths propagate in the same direction. In other embodiments, a majority of the first set of pump wavelengths have different wavelengths than the second set of pump wavelengths, all of the first set of pump wavelengths have different wavelengths than the second set of pump wavelengths or the first set of pump wavelengths have shorter wavelengths than the second set of pump wavelengths.

In another embodiment of the present invention, an amplifier apparatus includes an optical transmission line with an input to receive an optical signal, an output that passes the optical signal, a first gain fiber and a second gain fiber. A first WDM is positioned between the second gain fiber and the output. A first set of pump wavelengths is input to the first WDM. A second WDM is positioned between the first and second gain fibers. A second set of pump wavelengths is input to the second WDM. At least a portion of the first set of pump wavelengths are different than the second set of pump wavelengths. The first and second set of pump wavelengths propagate in the same direction.

In one embodiment, the total length of at least the first or the second Raman gain fiber is less than 20 km. In one embodiment, the optical amplifier is configured to be coupled to at least a first pair of pump sources that are separated by no more than 50 nm in wavelength, and in another embodiment by no more than 35 nm in wavelength.

A majority of the pump wavelengths can have powers within 50% of each other, or within 30% of each other. The sets of wavelengths travel in a reverse direction relative to the direction traveled by the optical signal. The sets of pump wavelengths can collectively produce a wavelength range $\lambda_p$ which can be 1250 nm to 1550 nm, or 1300 nm to 1530 nm. The first Raman gain fiber and the second pump source can define a first section, and the second Raman gain fiber and the first pump source can define a second section.

The optical amplifier can include a third section including a third Raman gain fiber coupled to a third pump source. One, or more of the pump sources can include at least one laser diode pump source. At least one length of at least one section, or at least one length of each section, can be controllable to adjust gain flatness of the multiple-stage optical amplifier gain as a function of optical signal wavelengths. A gain flatness of the optical amplifier can be optimized by pump wavelengths, pump powers and the number of pumps, or by a gain flattening filter.

Raman gain can provide broadband gain, because Raman gain is non-resonant and not tied to any specific wavelength, Raman bandwidth can be expanded by increasing the # of pump wavelengths (approximately 25 nm of bandwidth per pump wavelength), and Raman gain tilt can be actively controlled by adjusting pump powers. The degrees of freedom include pump wavelengths, pump power, number of pumps, point of injection of pumps, lengths of gain fiber and the use of gain flattening filters.

The present invention also provides a method of amplification. A Raman amplifier apparatus is used that includes an optical transmission line with an input to receive an optical signal, an output that passes the optical signal, a first Raman gain fiber and a second Raman gain fiber. A signal with multiple wavelengths is introduced into the input. The signal is amplified in the Raman amplifier apparatus. A majority of longer wavelengths of the signal are amplified before the shorter wavelengths are amplified.

In another embodiment of the present invention, a method of amplification provides an amplifier apparatus with first and second pump sources coupled to first and second ports of an optical transmission line, an output that passes the optical signal, a first gain fiber and a second gain fiber. Signals are introduced to an input of the optical transmission line. The first and second gain fibers are pumped with a first set of pump wavelengths from the first pump source and a second set of pump wavelengths from the second pump source. At least a portion of the first set of pump wavelengths is different than the second set of pump wavelengths. At least an 80 nm bandwidth of signal is amplified.

Figure 15:
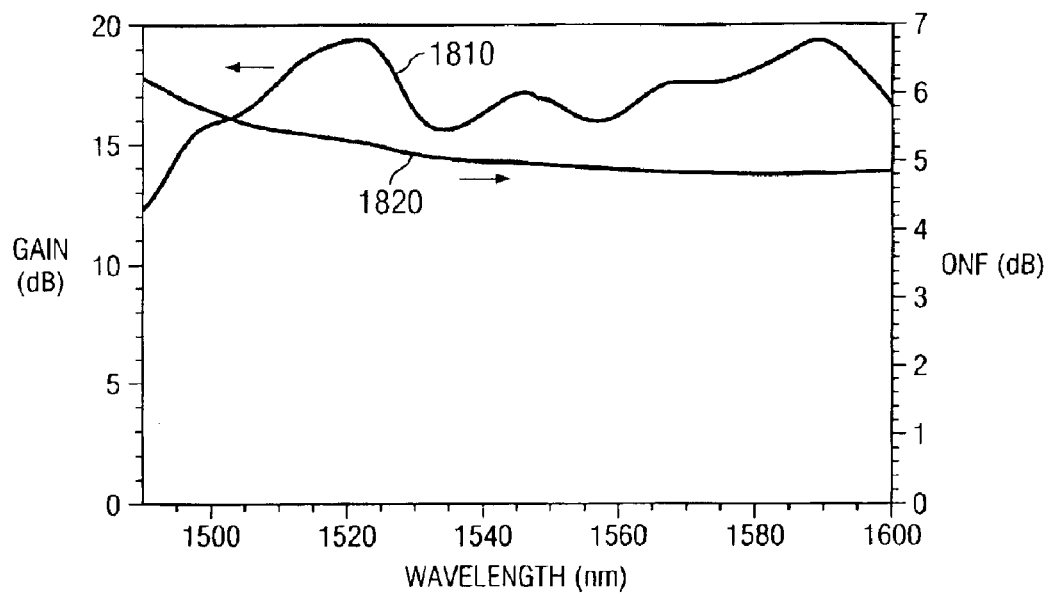
FIG. 15 is a graph of optical noise figure versus wavelength and gain versus wavelength for a single stage amplifier with multiple pump wavelengths.

FIG. 15 is a graph of optical noise figure versus wavelength and gain versus wavelength for a single stage amplifier with multiple pump wavelengths. In the embodiment of FIG. 15, the length of the first Raman gain fiber is 3.76 km, the length of the second Raman gain fiber is 3.6 km, the first set of pump wavelengths are 1396 nm and 1419 nm while the second set of pump wavelengths are 1437, 1455 nm and 1487 nm. The pump power for all five pump wavelengths is 360 mW.

Some advantages of an embodiment including a broadband amplifier include the use of a single amplifier without band splitters and combiners and without wavelength guard bands. More than 15 dB gain over 100 nm can be achieved with low noise figure in some embodiments, and multiple stages can be used for higher gains. The gain flatness can be controlled through the number of pumps, pump wavelengths, pump powers, the length of gain fibers as well as by using gain flattening filters. Pump powers can be more balanced, with reduced interaction between pumps, and requiring less gain pre-emphasis. Fewer pumps can be required.

Various embodiments have multiple points into which pump power is launched in a Raman amplifier. In one embodiment, shorter pump wavelengths can be introduced upstream (farther from the signal input) from the longer pump wavelengths. Shorter pump wavelengths can be robbed by longer pump wavelengths, and gain can be obtained from shorter pump wavelengths, such as in the last segment of the amplifier. Pump wavelengths can have comparable pump powers. The lengths of each section of gain fiber can exceed 200 m, and in some embodiments more than 1 km. The lengths of each section can be controlled to adjust gain flatness. Also, the number of pumps, pump wavelengths, use of a gain flattening filter and power, and can be adjusted for gain flatness.

Various embodiments of the present invention can include one or more of: dispersion compensation combined with a Raman amplifier, "violet" band Raman amplifiers with DSF, Raman amplifiers with dispersion managed systems, symmetric addition of bands, and distributed Raman amplification with multiple-bands.

Dispersion compensation can be combined with a Raman amplifier. The gain fiber can also perform dispersion compensation for a transmission line. The fiber can be single mode for pump and signal, such that the cut-off wavelength for the fiber can be shorter than the pump wavelength. The amplifier gain level can be set larger or equal to the sum of losses in the gain fiber as well as the loss in a segment of the fiber link.

Length and dispersion of the gain fiber can be selected such that the net dispersion of the amplifier $(D \times L)_{amp}$ can roughly balance the net dispersion in the fiber transmission link $(D \times L)_{Link}$. Optical gain can be provided in the same element that compensates the dispersion of the link for an optical amplifier. The gain medium can be a fiber that serves as a distributed gain medium pumped by laser diodes or a Raman oscillator.

The pumping level can be adjusted so that the gain can compensate roughly for the loss in the fiber link and the loss in the gain fiber. The Raman oscillator can be a cascaded Raman oscillator. The gain fiber can be a dispersion compensating fiber. The fiber can be pumped from one direction if it is less than 4 $L_{eff}$ for the pump. The fiber can be bi-directionally pumped if the length of the fiber exceeds the $L_{eff}$ for the pump. The fiber can be split into two parts with two pumps if the length of the fiber exceeds substantially the $L_{eff}$ for the pump. The two amplifier segments may be joined by an isolator, a gain equalization element and/or an optical add/drop multiplexer. The gain fiber can also do dispersion compensation for a transmission line. The gain can be in the wavelength range 1390–1650 nm. The gain fiber can be a dispersion compensating fiber. The fiber's length and dispersion can be selected to compensate for the net dispersion of the fiber transmission link.

If the length of the fiber is greater than 2 $L_{eff}$ than it can bi-directionally pumped. If the length of the fiber is greater than 2 $L_{eff}$ than it can be split into two parts that can be pumped separately. The two segments may be joined by an isolator, a gain equalization element and/or an optical add/drop multiplexer. Exemplary embodiments are shown in FIGS. 4, 5, and 6.

"Violet" band Raman amplifiers can be DSF. Fiber link systems can comprise dispersion shifted fibers with operation in the wavelength range of 1430–1530 nm. The wavelength range can be selected to avoid the zero dispersion wavelength, so that multi-wavelength WDM systems can operate with minimal nonlinearity penalties. The amplifier in the 1430–1530 nm range can be a Raman amplifier. The fiber in the Raman amplifier can be selected to also serve as a dispersion compensating element. The fiber transmission system can be with dispersion shifted fiber, and/or can be with Raman amplifiers operating over the 1430–1530 nm range. The system can be a multi-channel WDM system. The wavelength range can be selected so as to reduce 4WM and parametric amplification cross-talk.

Raman amplifiers can be used with dispersion managed systems. Dispersion managed systems can have dispersion compensating elements pumped by Raman pumps. The gain level of the Raman amplifier can be selected to compensate for the loss in the fiber link as well as the dispersion compensating element. The dispersion compensating element can be pumped with one Raman pump or can be bi-directionally pumped or pumped in two segments, depending on L and $L_{eff}$. An exemplary embodiment is shown in FIG. 8.

Raman gain fiber can be standard dispersion fiber. Gain equalizers can be placed periodically with the amplifiers, such as for multiple-wavelengths.

Bands can be added symmetrically. To minimize gain tilt changes in the C-band, channels in the L-band can be added in roughly equal number to channels in the S-band. The roughly symmetric (channel number wise) channel addition can balance Raman energy exchange in the C-band. The gain in the S-band can be larger than required to compensate for the linear loss to account for the Raman energy exchange.

Likewise, the gain in the L-band can be smaller than required to compensate for linear loss. To have the same SNR in the C-band and S-band, the bit-rate in the S-band can be lowered or the S-band amplifier can have a lower noise figure. The amplifier in the S-band can be a Raman amplifier, which can have a lower noise figure due to the four-level nature of the amplifier. The zero dispersion wavelength for the fiber can be kept outside of all three bands to permit sufficient walk-off to minimize inter-channel interference. Whereas the amplifiers in the C- and L-bands can be discrete amplifiers, the S-band amplifier can be a distributed amplifier to achieve an improved noise figure.

The distributed Raman amplification in the S-band can be achieved by pumping the transmission line with discrete laser diodes or by a Raman oscillator.

Distributed Raman amplification can have multiple-bands. In multi-band distributed systems, pumps can be orthogonalized so as to minimize interaction or energy exchange between pumps. In broadband distributed Raman amplification, the nonlinear interaction between pumps for different bands can be minimized by spatially dispersing alternate band pumps and/or by cross-polarizing alternate pump bands. Exemplary embodiments of hybrid systems are shown in FIG. 12(a)–FIG. 12(d). Exemplary embodiments of distributed systems are shown in FIG. 13(a)–FIG. 13(d). The distributed Raman amplification can be achieved by pumping the transmission line with discrete laser diodes or by a Raman oscillator.

Another embodiment is a method of amplification. The method includes providing a Raman amplifier including an optical transmission line with an input to receive an optical signal, an output that passes the optical signal, a first Raman gain fiber and a second Raman gain fiber; introducing into the input a signal with multiple wavelengths; amplifying the signal in the Raman amplifier, wherein a majority of longer signal wavelengths are amplified before shorter signal wavelengths are amplified; and producing an amplifier output.

The signal can be amplified and dispersion compensated in the Raman amplifier. More than 35 nm of bandwidth, or more than 50 nm of bandwidth, can be amplified. The signal can propagate in an upstream direction from the input to the output of the Raman amplifier apparatus. First and second sets of pump wavelengths can propagate in a downstream direction. A first pump source can provide the first set of pump wavelengths and a second pump source can provide the second set of pump wavelengths. Shorter signal wavelengths can receive more gain in the second Raman gain fiber than in the first Raman gain fiber. A gain flatness of the Raman amplifier can be optimized by pump wavelengths, pump powers and the number of pumps, and/or by at least one of a length of the first Raman gain fiber and a length of the second Raman gain fiber, or by a gain flattening filter. The wavelength range $\lambda_p$ of the pump can be 1250 nm to 1550 nm, or 1300 nm to 1530 nm. The optical signal can have a wavelength range $\lambda_s$ of 1400 to 1650 nm, or of 1430 to 1630 nm.

A signal may comprise one or more signals. In one embodiment, each of the one or more signals may be characterized by a wavelength or wavelength range distinct from other signal wavelengths or other signal wavelength ranges, such as in wavelength division multiplexing. A signal traveling in a direction, such as downstream or upstream, includes a signal traveling substantially in the direction, and/or where a majority of the power of the signal is initially traveling in the direction and/or traveling in the direction. A signal traveling in a direction, such as upstream or downstream, may be accompanied by a scattered beam traveling in another direction, such as the opposite direction, due to linear and/or nonlinear mechanisms such as Rayleigh scattering and/or Brillouin scattering. Shorter wavelengths are wavelengths shorter than a longest wavelength of a wavelength range. Shorter wavelengths can include wavelengths anywhere from the shortest wavelength of the wavelength range, up to but not including the longest wavelength of the wavelength range. Shorter wavelengths may refer to a fraction of the wavelength range, such as a lower half, or a lower third, of the wavelength range, or a fixed subset of the wavelength range, such as a lower 5, 10, 15, or 20 nm of the wavelength range. While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A Raman amplifier apparatus, comprising:
   an optical transmission line including an input operable to receive an optical signal comprising a plurality of optical signal wavelengths, an output operable to pass at least a portion of the optical signal, a first Raman gain fiber and a second Raman gain fiber;
   a first optical coupler positioned between the second Raman gain fiber and the output, wherein a first plurality of pump wavelengths is input to the first optical coupler, and wherein at least two of the first plurality of pump wavelengths comprise different center wavelengths; and
   a second optical coupler positioned between the first and second Raman gain fibers, wherein a second plurality of pump wavelengths is input to the second optical coupler, and wherein at least two of the second plurality of pump wavelengths comprise different center wavelengths;
   wherein at least a portion of the first plurality of pump wavelengths comprise different center wavelengths than the second plurality of pump wavelengths, wherein the first and second pluralities of pump wavelengths propagate in a same direction and wherein a majority of shorter optical signal wavelengths receive more gain in the second Raman gain fiber than in the first Raman gain fiber.

2. The apparatus of claim 1, wherein a majority of the first plurality of pump wavelengths have different wavelengths than the second plurality of pump wavelengths.

3. The apparatus of claim 1, wherein all of the first plurality of pump wavelengths have different wavelengths than the second plurality of pump wavelengths.

4. The apparatus of claim 1, wherein at least a portion of the first plurality of pump wavelengths comprise shorter center wavelengths than the center wavelengths of the second plurality of pump wavelengths.

5. The apparatus of claim 1, wherein a length of at last one of the first and the second Raman gain fibers is less than 20 km.

6. The apparatus of claim 1, wherein the apparatus is configured to be coupled to at least a first pair of pump sources that are separated by no more than 50 nm in wavelength.

7. The apparatus of claim 1, wherein the apparatus is configured to be coupled to at least a first pair of pump sources that are separated by no more than 35 nm in wavelength.

8. The apparatus of claim 1, wherein a majority of gain from the pump wavelengths is provided to signal wavelengths input to the apparatus.

9. The apparatus of claim 1, wherein the optical signal propagates in a upstream direction from the input to the output, and the first and second pluralities of pump wavelengths propagate in a downstream direction towards the input.

10. The apparatus of claim 1, wherein the second optical coupler is configured to substantially pass the optical signal and at least a portion of the first plurality of pump wavelengths.

11. The apparatus of claim 1, wherein the first optical coupler is configured to substantially pass the optical signal.

12. The apparatus of claim 1, wherein the second plurality of pump wavelengths provides gain to a majority of wavelengths of the optical signal and extracts optical energy from at least a portion of the first plurality of pump wavelengths.

13. The apparatus of claim 1, wherein the optical signal includes a band of wavelengths.

14. The apparatus of claim 13, wherein the band wavelengths includes a continuous range of wavelengths.

15. The apparatus of claim 13, wherein the band of wavelengths includes a plurality of ranges of wavelengths.

16. The apparatus of claim 1, wherein a majority of the pump wavelengths have powers within 50% of each other.

17. The apparatus of claim 1, wherein a majority of the pump wavelengths have powers within 30% of each other.

18. The apparatus of claim 1, wherein a length of each Raman gain fiber is at least 200 m.

19. The apparatus of claim 1, wherein a length of each Raman gain fiber is at least 1 kilometer.

20. The apparatus of claim 1, wherein the first Raman gain fiber is coupled to a second pump source providing the second plurality of pump wavelengths, and the second Raman gain fiber is coupled to a first pump source providing the first plurality of pump wavelengths, the first Raman gain fiber and the second pump source defining a first section, and the second Raman gain fiber and the first pump source defining a second section.

21. The apparatus of claim 20, further comprising:
at least a third section including a third Raman gain fiber coupled to a third pump source.

22. The apparatus of claim 1, wherein a length of each Raman gain fiber is controllable to adjust gain flatness of the Raman amplifier apparatus gain as a function of wavelengths of the optical signal.

23. The apparatus of claim 1, wherein a gain flatness of the Raman amplifier apparatus is optimized by a gain flattening filter.

24. The apparatus of claim 1, wherein a gain flatness of the Raman amplifier apparatus is optimized by pump wavelengths, pump powers and a number of pumps.

25. The apparatus of claim 1, wherein the first and second pluralities of pump wavelengths collectively produce a wavelength range $\lambda_p$ spanning at least 60 nanometers.

26. The apparatus of claim 25, wherein the wavelength range $\lambda_p$ includes 1250 nm to 1550 nm.

27. The apparatus of claim 25, wherein the wavelength range $\lambda_p$ includes 1300 nm to 1530 nm.

28. The apparatus of claim 1, wherein the optical signal has a wavelength range $\lambda_S$ including 1400 to 1650 nm.

29. The apparatus of claim 1, wherein the optical signal has a wavelength range $\lambda_S$ including 1430 to 1630 nm.

30. The apparatus of claim 1, further comprising:
a first lossy member positioned between the first and second Raman gain fibers.

31. The apparatus of claim 30, wherein the first lossy member is an add/drop multiplexer.

32. The apparatus of claim 30, wherein the first lossy member is a gain equalization element.

33. The apparatus of claim 30, wherein the first loss member is a dispersion compensating element.

34. The apparatus of claim 1, wherein at least a portion of one of the first and second Raman gain fibers is a dispersion compensating fiber.

35. The apparatus of claim 1, wherein at least a portion both the first and second Raman gain fibers is a dispersion compensating fiber.

36. The apparatus of claim 20, wherein each of the first and second pump sources includes at least one laser diode pump source.

37. An optical amplifier, comprising:
an optical fiber including a signal input port to receive an optical sign comprising a plurality of optical signal wavelengths, an optical signal output port, at least a first Raman gain fiber and a second Raman gain fiber;
a first optical coupler positioned between the second Raman gain fiber and the output port, the first optical coupler configured to be coupled to a first pump source that produces a first plurality of pump wavelengths, at least some of the first plurality of pump wavelengths having different center wavelengths; and
a second optical coupler positioned between the first and second Raman gain fibers, the second optical coupler configured to be coupled to a second pump source that produces a second plurality of pump wavelengths, at least some of the second plurality of pump wavelengths having different center wavelengths;
wherein at least a portion of the first plurality of pump wavelengths comprise different center wavelengths than the second plurality of pump wavelengths, wherein a majority of shorter optical signal wavelengths receive more gain in the second Raman gain fiber than in the first Raman gain fiber, and wherein the optical signal travels in a first direction, and the first and second pluralities of pump wavelengths travel in a reverse direction relative to the first direction.

38. The optical amplifier of claim 37, wherein a majority of the first plurality of pump wavelengths have different wavelengths than the second plurality of pump wavelengths.

39. The optical amplifier of claim 37, wherein all of the first plurality of pump wavelengths have different wavelengths than the second plurality of pump wavelengths.

40. The optical amplifier of claim 37, wherein at least a portion of the first plurality of pump wavelengths have shorter wavelengths than the second plurality of pump wavelengths.

41. The optical amplifier of claim 37, wherein a length of at least one of the first and the second Raman gain fibers is less than 20 km.

42. The optical amplifier of claim 37, wherein a wavelength gap between the first and second pluralities of pump wavelengths is no more than 50 nm.

43. The optical amplifier of claim 37, wherein a wavelength gap between the first and second pluralities of pump wavelengths is no more than 35 nm.

44. The optical amplifier of claim 37, wherein the majority of gain from the pump wavelengths is provided to signal wavelengths input to the apparatus.

45. The optical amplifier of claim 37, wherein the second optical coupler is configured to substantially pass the optical signal and at least a portion of the first plurality of pump wavelengths.

46. The optical amplifier of claim 37, wherein the first optical coupler is configured to substantially pass the optical signal.

47. The optical amplifier of claim 37, wherein the second plurality of pump wavelengths provides gain to a majority of wavelengths of the optical signal and extracts optical energy from at least a portion of the first plurality of pump wavelengths.

48. The optical amplifier of claim 37, wherein the optical signal includes a band of wavelengths.

49. The optical amplifier of claim 48, wherein the band of wavelengths includes a continuous range of wavelengths.

50. The optical amplifier of claim 48, wherein the band of wavelengths includes a plurality of ranges of wavelengths.

51. The optical amplifier of claim 37, wherein a majority of the pump wavelengths have powers within 50% of each other.

52. The optical amplifier of claim 37, wherein a majority of the pump wavelengths have powers within 30% of each other.

53. The optical amplifier of claim 37, wherein a length of each Raman gain fiber is at least 200 m.

54. The optical amplifier of claim 37, wherein a length each Raman gain fiber is at least 1 kilometer.

55. The optical amplifier of claim 37, further comprising:
the first pump source and the second pump source, wherein the first Raman gain fiber and the second pump source define a first section, and the second Raman gain fiber and the first pump source define a second section.

56. The optical amplifier of claim 55, further comprising:
at least a third section including a third Raman gain fiber coupled to third pump source.

57. The optical amplifier of claim 37, wherein a length of each Raman gain fiber is controllable to adjust a gain flatness of the optical amplifier as a function of wavelengths of the optical signal.

58. The optical amplifier of claim 37, wherein a gain flatness of the optical amplifier is optimized by pump wavelengths, pump powers and a number of pumps.

59. The optical amplifier of claim 37, wherein a gain flatness of the optical amplifier is optimized by a gain flattening filter.

60. The optical amplifier of claim 37, wherein the first and second pluralities of pump wavelengths collectively produce a wavelength range $\lambda_p$ spanning at least 60 nanometers.

61. The optical amplifier of claim 60, wherein the wavelength range $\lambda_p$ includes 1250 nm to 1550 nm.

62. The optical amplifier of claim 60, wherein the wavelength range $\lambda_p$ includes 1300 nm to 1530 nm.

63. The optical amplifier of claim 37, wherein the optical signal has a wavelength range $\lambda_S$ including 1400 to 1650 nm.

64. The optical amplifier of claim 37, wherein the optical signal has a wavelength range $\lambda_S$ including 1430 to 1630 nm.

65. The optical amplifier of claim 37, further comprising:
a first lossy member positioned between the first and second Raman gain fibers.

66. The optical amplifier of claim 65, wherein the first lossy member is an add/drop multiplexer.

67. The optical amplifier of claim 65, wherein the first lossy member is a gain equalization element.

68. The optical amplifier of claim 65, wherein the first lossy member is a dispersion compensating element.

69. The optical amplifier of claim 37, wherein at least a portion of one of the first and second Raman gain fibers is a dispersion compensating fiber.

70. The optical amplifier claim 37, wherein at least a portion of both the first and second Raman gain fibers is a dispersion compensating fiber.

71. The optical amplifier of claim 37, wherein each of the first and second pump sources includes at least one laser diode pump source.

72. An amplifier apparatus, comprising:
an optical transmission line including an input operable to receive an optical signal comprising a plurality of optical signal wavelengths, an output that passes at least a portion of the optical signal, a first gain fiber and a second gain fiber;
a first optical coupler positioned between the second gain fiber and the output, wherein one or more first pump wavelengths is input to the first optical coupler; and
a second optical coupler positioned between the first and second gain fibers, wherein one or more second pump wavelengths is input to the second optical coupler;
wherein at least one of the one or more first pump wavelengths is different than the one or more second pump wavelengths, wherein the one or more first and one or more second pump wavelengths propagate in a same direction, and wherein a majority of the shorter signal wavelengths receive more gain in the second gain fiber than in the first gain fiber; and
wherein the second optical coupler substantially passes at least a portion of the optical signal and at least a portion of the one or more first pump wavelengths.

73. The apparatus of claim 72, wherein a majority of the one or more first pump wavelengths have different wavelengths than the one or more second pump wavelengths.

74. The apparatus of claim 72, wherein all the one or more first pump wavelengths have different wavelengths the one or more second pump wavelengths.

75. The apparatus of claim 72, wherein at least a portion of the one or more first pump wavelengths have shorter center wavelengths than the one or more second pump wavelengths.

76. The apparatus of claim 72, wherein at least one of the gain fibers includes at least one dopant that improves amplification in the gain fiber.

77. The apparatus of claim 72, wherein the majority of gain from the pump wavelengths is provided to signal wavelengths input to the apparatus.

78. The apparatus of claim 72, wherein the optical signal propagates in an upstream direction from the input to the output, and the first and second pump wavelengths propagate in a downstream direction towards the input.

79. The apparatus of claim 72, wherein the first optical coupler is configured to substantially pass the optical signal.

80. The apparatus of claim 72, wherein the one or more second pump wavelengths provides gain to a majority of wavelengths of the optical signal and extracts optical energy from at least a portion of the one or more first pump wavelengths.

81. The apparatus of claim 72, wherein the optical signal includes a band of wavelengths.

82. The apparatus of claim 81, wherein the band of wavelengths includes a continuous range of wavelengths.

83. The apparatus of claim 81, wherein the band of wavelengths includes a plurality of ranges of wavelengths.

84. The apparatus of claim 72, wherein a majority of the pump wavelengths have powers within 50% of each other.

85. The apparatus of claim 72, wherein a majority of the pump wavelengths have powers within 30% of each other.

86. The apparatus of claim 72, wherein the first gain fiber is coupled to a second pump source providing the one or more second pump wavelengths, and the second gain fiber is coupled to a first pump source providing the one or more first pump wavelengths, the first gain fiber and the second pump source defining a first section, and the second gain fiber and the first pump source defining a second section.

87. The apparatus of claim 86, further comprising:
at least a third section including a third gain fiber coupled to a third pump source.

88. The apparatus of claim 72, wherein a length of each gain fiber is controllable to adjust a gain flatness of the amplifier apparatus as a function of wavelengths of the optical signal.

89. The apparatus of claim 72, wherein a gain flatness of the amplifier apparatus is optimized by a gain flattening filter.

90. The apparatus of claim 72, wherein a gain flatness of the amplifier apparatus is optimized by pump wavelengths, pump powers and a number of pumps.

91. The apparatus of claim 72, wherein the first and second pump wavelengths collectively produce a wavelength range $\lambda_p$ spanning at least 60 nanometers.

92. The apparatus of claim 91, wherein the wavelength range $\lambda_p$ includes 1250 nm to 1550 nm.

93. The apparatus of claim 91, wherein the wavelength range $\lambda_p$ includes 1300 nm to 1530 nm.

94. The apparatus of claim 72, wherein the optical signal has a wavelength range $\lambda_S$ including 1400 to 1650 nm.

95. The apparatus of claim 72, wherein the optical signal has a wavelength range $\lambda_S$ including 1430 to 1630 nm.

96. The apparatus of claim 72, further comprising:
a first lossy member positioned between the first and second gain fibers.

97. The apparatus of claim 96, wherein the first lossy member is an add/drop multiplexer.

98. The apparatus of claim 96, wherein the first lossy member is a gain equalization element.

99. The apparatus of claim 96, wherein the first lossy member is a dispersion compensating element.

100. The apparatus of claim 72, wherein at least a portion of one of the first and second gain fibers is a dispersion compensating fiber.

101. The apparatus of claim 72, wherein at least a portion of both the first and second gain fibers is a dispersion compensating fiber.

102. The apparatus of claim 86, wherein each of the first and second pump sources includes at least one laser diode pump source.

* * * * *